(12) United States Patent
Lone et al.

(10) Patent No.: US 12,351,131 B2
(45) Date of Patent: Jul. 8, 2025

(54) VEHICLE CONSOLES INCLUDING STORAGE COMPARTMENTS

(71) Applicant: Nissan North America, Inc., Franklin, TN (US)

(72) Inventors: Qudsia Lone, Troy, MI (US); Thomas Cho, Novi, MI (US); David Smolik, Windsor (CA); Adam Decraene, Farmington Hills, MI (US); David K. Shimokochi, Manchester, MI (US)

(73) Assignee: Nissan North America, Inc., Franklin, TN (US)

( * ) Notice: Subject to any disclaimer, the term of this patent is extended or adjusted under 35 U.S.C. 154(b) by 521 days.

(21) Appl. No.: 17/713,318

(22) Filed: Apr. 5, 2022

(65) Prior Publication Data
US 2023/0311776 A1  Oct. 5, 2023

(51) Int. Cl.
*B60R 7/04* (2006.01)
*B60R 11/00* (2006.01)
*B60N 2/75* (2018.01)

(52) U.S. Cl.
CPC ............ *B60R 7/04* (2013.01); *B60R 11/00* (2013.01); *B60N 2/793* (2018.02); *B60R 2011/0007* (2013.01); *B60R 2011/0084* (2013.01); *B60R 2011/0092* (2013.01); *B60R 2011/0094* (2013.01)

(58) Field of Classification Search
CPC .............. B60R 19/205; B60R 21/0134; B60R 21/2338; B60R 21/36; B60R 2021/0004; B60R 2021/01013; B60R 2021/23324; B60R 2021/23384; B60R 7/06; B60R 7/04; B60R 2011/0007; B60R 11/00; B60R 2011/0084; B60R 2011/0092; B60R 2011/0094; F16H 21/44; B60N 2/793
USPC .................................. 296/37.1, 24.34, 37.8
See application file for complete search history.

(56) References Cited

U.S. PATENT DOCUMENTS

| 7,354,086 B2 | 4/2008 | Park | |
| 7,931,322 B2 * | 4/2011 | O'Brien | B60N 2/793 296/37.8 |
| 8,894,120 B2 * | 11/2014 | Lechkun | B60R 7/04 296/37.8 |

(Continued)

FOREIGN PATENT DOCUMENTS

| EP | 3853074 A1 * | 7/2021 | ............ B60N 2/753 |
| JP | 2006151013 A | 6/2006 | |

(Continued)

*Primary Examiner* — Dennis H Pedder
(74) *Attorney, Agent, or Firm* — Young Basile Hanlon & MacFarlane, P.C.

(57) ABSTRACT

The present disclosure describes a vehicle console that includes: a housing defining an inner chamber; a panel that is movable in relation to the housing such that the vehicle console is reconfigurable between a first configuration and a second configuration; and an actuation assembly including a scissor lift that is connected to the panel to facilitate reconfiguration of the vehicle console between the first configuration and the second configuration. When the vehicle console is in the first configuration, the panel is generally flush with an outer surface of the housing, and when the vehicle console is in the second configuration, the panel is recessed into the housing so as to define a storage compartment that is configured to receive a personal article.

18 Claims, 10 Drawing Sheets

(56) References Cited

U.S. PATENT DOCUMENTS

| | | | |
|---|---|---|---|
| 10,099,594 B2 | 10/2018 | Salinas et al. | |
| 10,471,875 B2* | 11/2019 | Kim | B60N 3/002 |
| 10,868,433 B2 | 12/2020 | Han | |
| 2013/0105536 A1 | 5/2013 | Simon et al. | |
| 2022/0153202 A1* | 5/2022 | Beyersdorfer | B60R 7/06 |

FOREIGN PATENT DOCUMENTS

| | | | |
|---|---|---|---|
| KR | 19980021491 | * | 10/1996 |
| KR | 19980042227 U | * | 9/1998 |

* cited by examiner

VEHICLE CONSOLES INCLUDING STORAGE COMPARTMENTS

TECHNICAL FIELD

The present disclosure relates to the storage of (personal) articles in vehicles. More specifically, the present disclosure relates to a vehicle console (e.g., a center console) including a drop-away panel, which allows for reconfiguration of the vehicle console so as to selectively expose an external storage compartment.

BACKGROUND

Many vehicles include one or more storage compartments, which are typically located in the dashboard, within the center console, or in the door panels. Certain articles, however, such as purses, totes, bags, and the like, may be too large for storage in these conventional locations. As a result, these larger articles are often placed on the floor of the vehicle, in the front or rear footwells, on the dashboard, on the passenger seat, etc., which can be cumbersome and inconvenient, particularly in the context of articles that are subject to repeated storage and removal.

To address this concern, the present disclosure describes a drop-away vehicle console including a panel that is selectively movable so as to expose an external storage compartment, which allows for more convenient access to the article(s) stowed therein.

SUMMARY

In one aspect of the present disclosure, a vehicle console is disclosed that includes: a housing defining an inner chamber; a panel that is movable in relation to the housing such that the vehicle console is reconfigurable between a first configuration and a second configuration; and an actuation assembly including a scissor lift that is connected to the panel to facilitate reconfiguration of the vehicle console between the first configuration and the second configuration. When the vehicle console is in the first configuration, the panel is generally flush with an outer surface of the housing, and when the vehicle console is in the second configuration, the panel is recessed into the housing so as to define a storage compartment that is configured to receive a personal article.

In certain embodiments, the vehicle console may further include a cupholder that is configured to removably receive one or more containers.

In certain embodiments, the cupholder may be spaced axially from the housing along a longitudinal axis that extends in generally parallel relation to a length of the vehicle console.

In certain embodiments, the actuation assembly may further include a drive mechanism that is configured to expand and contract the scissor lift and thereby facilitate reconfiguration of the vehicle console between the first configuration and the second configuration.

In certain embodiments, the scissor lift may include an upper end that is connected to the panel and a lower end that is connected to the drive mechanism.

In certain embodiments, the upper end of the scissor lift may be pivotably and linearly movable in relation to the panel, and the lower end of the scissor lift may be pivotably and linearly movable in relation to the housing.

In certain embodiments, the lower end of the scissor lift may be pivotably connected to the drive mechanism.

In certain embodiments, the drive mechanism may include: a motor; a drive shaft that is rotatably connected to the motor; a pinion that is supported by the drive shaft such that rotation of the drive shaft causes corresponding rotation of the pinion; and a rack that is in engagement with the pinion such that rotation of the pinion causes linear movement of the rack.

In certain embodiments, the lower end of the scissor lift may be pivotably connected to the rack such that linear movement of the rack causes corresponding linear movement of the lower end of the scissor lift to thereby expand and contract the scissor lift.

In certain embodiments, the drive mechanism may include a biasing member that is configured to bias the vehicle console towards the first configuration.

In certain embodiments, the vehicle console may further include a retention mechanism that is configured for releasable engagement with the scissor lift to selectively maintain the vehicle console in the second configuration.

In another aspect of the present disclosure, a vehicle console is disclosed that includes: a housing defining an inner chamber; a panel that is movable in relation to the housing between an upper vertical position and a lower vertical position in which the vehicle console defines a storage compartment that is configured to receive a personal article; and an actuation assembly that is configured to facilitate movement of the panel between the upper vertical position and the lower vertical position. The actuation assembly includes: an upper scissor assembly that is connected to the panel; a lower scissor assembly that is connected to the upper scissor assembly; and a drive mechanism that is connected to the lower scissor assembly such that the lower scissor assembly extends between the upper scissor assembly and the drive mechanism.

In certain embodiments, the actuation assembly may further include a stop that is configured for engagement with the lower scissor assembly to restrict movement of the actuation assembly.

In certain embodiments, the upper scissor assembly may be pivotably and linearly movable in relation to the panel.

In certain embodiments, the lower scissor assembly may be pivotably connected to the upper scissor assembly.

In certain embodiments, the lower scissor assembly may be pivotably and linearly movable in relation to the housing.

In certain embodiments, the drive mechanism may include a rack that is pivotably connected to the lower scissor assembly such that linear movement of the rack causes corresponding linear movement of the lower scissor assembly.

In certain embodiments, the rack may be movable along a first axis and the actuation assembly may be movable along a second axis that extends in generally orthogonal relation to the first axis.

In another aspect of the present disclosure, a vehicle console is disclosed that includes: a housing; a drive mechanism that is located within the housing; and a panel that is operatively connected to the drive mechanism such that the panel is movable in relation to the housing along an axis of movement to thereby facilitate reconfiguration of the vehicle console between a normal configuration, in which the panel is generally flush with an outer surface of the housing, and a storage configuration, in which the panel is recessed into the housing so as to define a storage compartment that is configured to receive a personal article. The drive mechanism includes a pinion and a rack that is in engagement with the pinion such that rotation of the pinion causes linear movement of the rack.

In certain embodiments, the rack may extend in generally orthogonal relation to the axis of movement.

In certain embodiments, the rack may extend in generally parallel relation to the axis of movement.

BRIEF DESCRIPTION OF THE DRAWINGS

According to common practice, the various features of the drawings may not be to scale and may be arbitrarily expanded or reduced for clarity.

DETAILED DESCRIPTION

Figure 1:
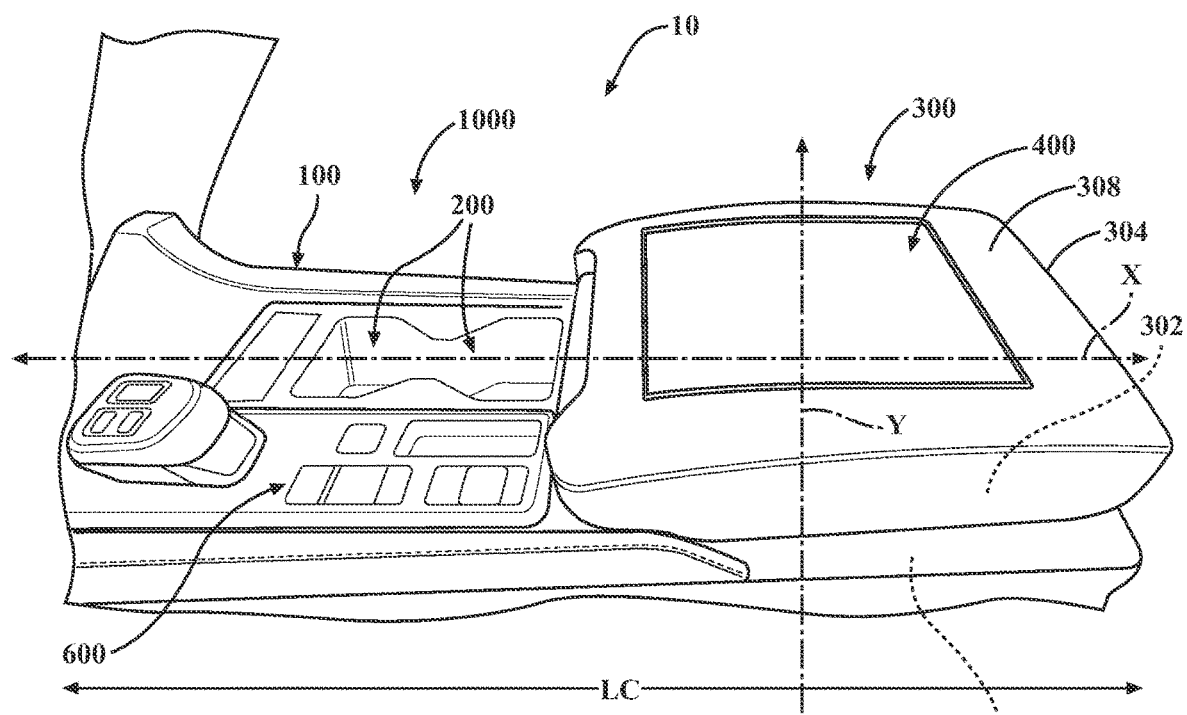
FIG. 1 is a side, perspective view of a vehicle console according to the principles of the present disclosure and shown in a first (normal) configuration, which includes: a housing; a panel; and an actuation assembly.

The present disclosure describes vehicle consoles that are selectively reconfigurable to create additional storage options within a vehicle. More specifically, the vehicle consoles described herein include a movable panel that can be recessed (e.g., dropped away) via an actuation assembly in order to reveal an external storage compartment that is configured to receive one or more (personal) articles.

With reference to FIGS. 1-7, the presently disclosed vehicle console will be discussed, which is identified by the reference character 1000. Although generally shown and described in the context of a passenger vehicle 10, it should be appreciated that vehicle console 1000 may be incorporated into a wide variety of vehicles including, for example, trucks, SUVs, vans, boats, airplanes, trains, etc. As described in detail below, the vehicle console 1000 includes: a main body portion 100; one or more cupholders 200; a housing 300; a panel 400, which is movable in relation to the housing 300; an actuation assembly 500, which is connected to the panel 400 to facilitate movement thereof; and a control panel 600, which regulated operation of the actuation assembly 500 and, thus, movement of the panel 400.

The cupholder(s) 200 extend (vertically) into the main body portion 100 of the vehicle console 1000 and are configured to receive one or more containers (not shown). While the vehicle console 1000 is shown as including two cupholders 200 in the particular embodiment illustrated, it should be appreciated that the particular number of cupholders 200 may be varied in alternate embodiments without departing from the scope of the present disclosure.

The housing 300 defines an inner chamber (cavity) 302 and is spaced axially from (e.g., is positioned rearwardly of) the cupholder(s) 200 along a first (horizontal, longitudinal) axis X, which extends in parallel (or generally parallel) relation to a length LC of the vehicle console 1000. The housing 300 is a discrete component of the vehicle console 1000 that is separate and apart from the cupholder(s) 200 and, in the particular embodiment illustrated, is configured as an armrest 304 that is movably (e.g., pivotably and/or slidably) connected to the main body portion 100. Movably connecting the armrest 304 to the main body portion 100 allows for repositioning of the armrest 304 between open and closed positions to expose and conceal an internal (first, main, primary) storage compartment 306i, which extends into the main body portion 100 and is located (vertically) beneath the armrest 304. Embodiments are also envisioned, however, in which the vehicle console 1000 may be devoid of the internal storage compartment 306i, which would allow for a fixed (e.g., non-movable) connection between the armrest 304 and the main body portion 100.

As described in further detail below, the vehicle console 1000 is reconfigurable between a first (normal, initial) configuration (FIG. 1) and a second (storage, subsequent) configuration (FIG. 2) via operation (activation) of the actuation assembly 500 and movement of the panel 400 into and out of the inner chamber 302 along a second (vertical) axis Y (also referred to herein as the axis of movement), which extends in orthogonal (or generally orthogonal) relation to the axis X. When the vehicle console 1000 is in the first configuration, the panel 400 is located in an upper (first, elevated) vertical position, in which the panel 400 is flush (or generally flush) with an outer (e.g., upper) surface 308 of the housing 300 such that the panel 400 and the outer surface 308 are in vertical alignment (or general vertical alignment) along the axis Y. By contrast, when the vehicle console 1000 is in the second configuration, the panel 400 is located in a lower (second) vertical position and is out of vertical alignment with the outer surface 308 of the housing 300. More specifically, when the vehicle console 1000 is in the second configuration, the panel 400 is recessed into the housing 300 (e.g., the inner chamber 302), whereby the vehicle console 1000 defines an external (second, ancillary) storage compartment 306ii (FIG. 2), a floor (bottom, lower end) of which is defined by the panel 400.

Figure 2:
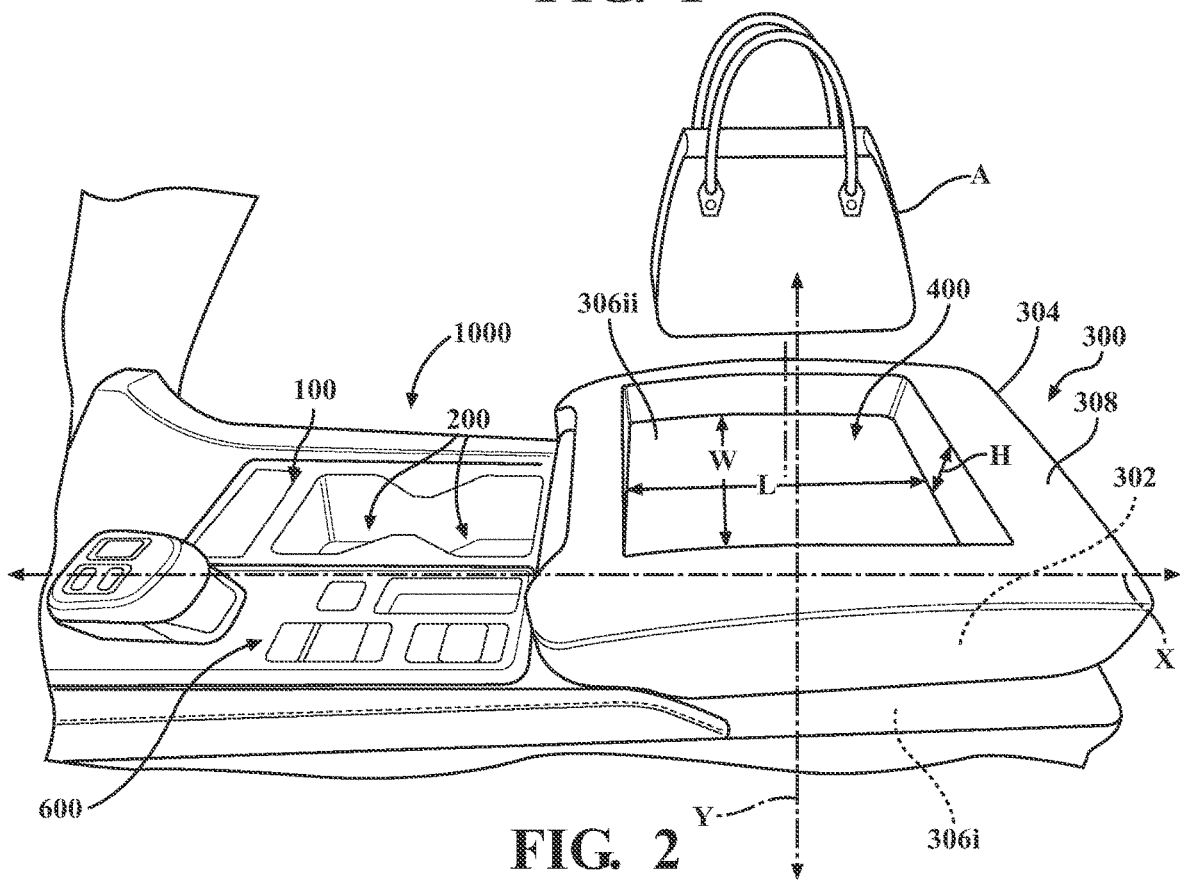
FIG. 2 is a side, perspective view of the vehicle console shown in a second (storage) configuration.
Figure 3:
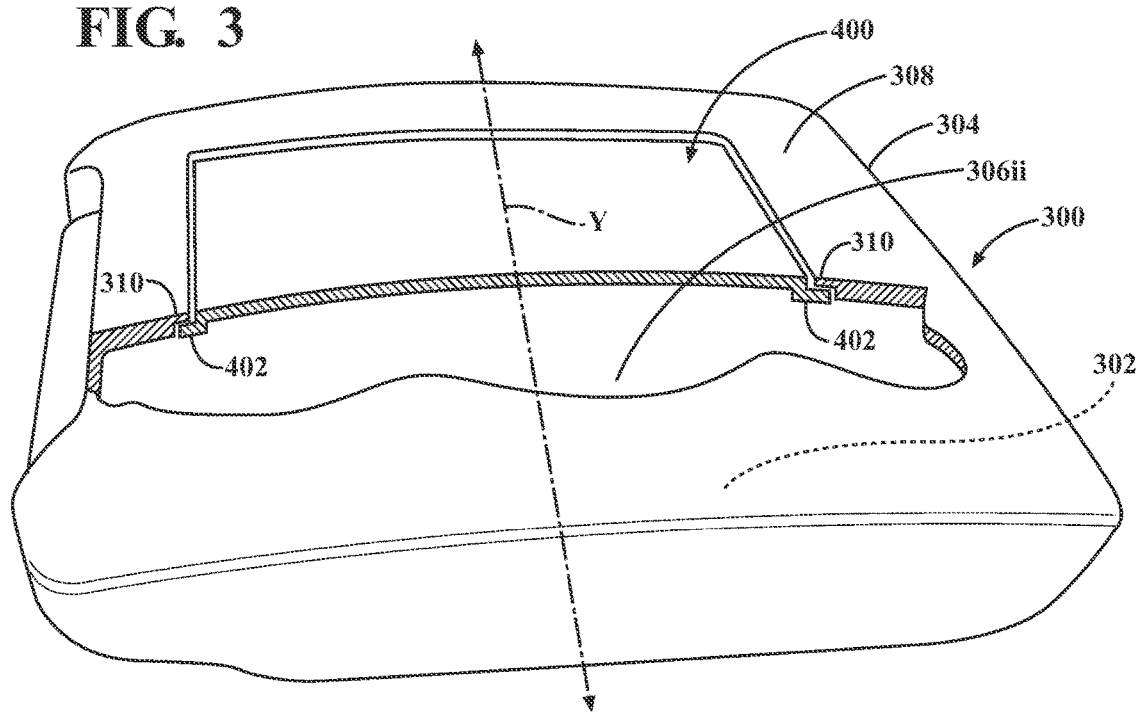
FIG. 3 provides a cutaway view of the vehicle console according to one embodiment of the present disclosure.

The external storage compartment 306ii is configured to receive one or more (personal) articles A (e.g., one or more purses, totes, bags, or the like). As seen in FIG. 2, the external storage compartment 306ii is located (vertically) above the internal storage compartment 306i, which allows for convenient access to the article(s) A that may otherwise be accommodated on the floor of the passenger vehicle 10, in the front or rear footwells, on the dashboard, on the passenger seat, etc., resulting in cumbersome stowage and retrieval of the article(s) A. Due to its external, open configuration, the external storage compartment 306ii also allows for the accommodation of article(s) A that exceed the spatial constraints provided by the internal storage compartment 306i.

Figure 7:
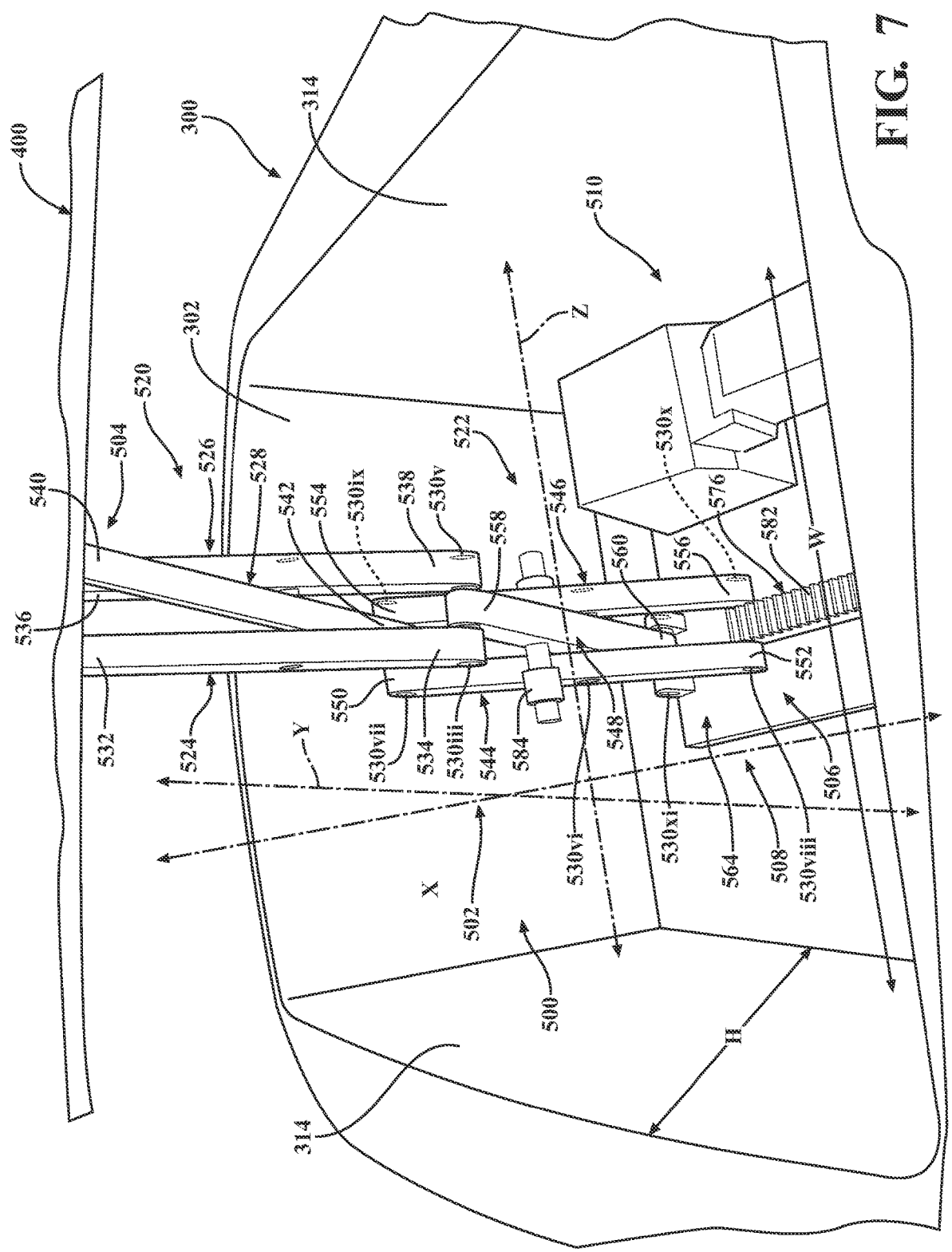
FIG. 7 is a rear, perspective view of the actuation assembly.

In the particular embodiment illustrated, the housing 300 and the panel 400 are configured such that the external storage compartment 306ii defines a length L (FIG. 2), a height H (FIGS. 2, 7), and width W (FIGS. 2, 7). The length L lies substantially within the range of (approximately) 7" to (approximately) 9" and extends in parallel (or generally parallel) relation to the axis X, the height H lies substantially within the range of (approximately) 2" to approximately 4" and extends in parallel (or generally parallel) relation to the axis Y, and the width W lies substantially within the range of (approximately) 9" to (approximately) 11" and extends along a third (lateral) axis Z (FIG. 7), which is oriented in orthogonal (or generally orthogonal) relation to the each of the axes X, Y. It should be appreciated, however, that the particular dimensions of the external storage compartment 306*ii* may be varied in alternate embodiments without departing from the scope of the present disclosure (e.g., depending upon the style of the passenger vehicle 10, spatial constraints, the particular location of the vehicle console 1000, etc.). As such, a storage compartment 306*ii* with one or more dimensions that lie outside the aforementioned ranges are also envisioned herein and would not be beyond the scope of the present disclosure.

In the particular embodiment of the disclosure illustrated, the panel 400 includes a polygonal (or generally polygonal) configuration (e.g., square, rectangular, etc.). It should be appreciated, however, that the particular configuration of the panel 400 may be varied in alternate embodiments without departing from the scope of the present disclosure. For example, it is envisioned that the panel 400 may include a non-polygonal configuration (e.g., circular, elliptical, etc.), which would allow for the provision of one or more additional cupholders 200 when the vehicle console 1000 is in the second configuration.

In certain embodiments of the disclosure, it is envisioned that the housing 300 and the panel 400 may be configured to inhibit (if not entirely prevent) fluid migration into the inner chamber 302 when the vehicle console 1000 is in the first configuration (e.g., in the event of a spill). For example, with reference to FIG. 3, in the particular embodiment of the vehicle console 1000 illustrated, the housing 300 and the panel 400 define corresponding flanges 310, 402 (e.g., shoulders, lips, overhangs, etc.), respectively. When the vehicle console 1000 is in the first configuration, the flanges 310, 402 are positioned in adjacent (or generally adjacent) vertical relation (along the axis Y) so as to define a barrier to fluid migration. To further inhibit (if not entirely prevent) the migration of fluid into the inner chamber 302, it is envisioned that the housing 300 and/or the panel 400 may include one or more sealing members (not shown), bristle strips, etc., which may be positioned in any suitable location, such as, for example, on the flange 310 and/or the flange 402.

In certain embodiments of the disclosure, it is envisioned that the housing 300 may include one or more openings (e.g., perforations, slits, apertures, etc.) in a bottom wall 312 (FIG. 6) thereof to allow fluid to drain from the inner chamber 302 into the internal storage compartment 306*i*. To further encourage drainage of the inner chamber 302, it is envisioned that the housing 300 (e.g., the bottom wall 312) may include one or more channels that are configured to collect and direct fluid into the openings.

The panel 400 includes a plurality (series) of anchor members 404 (FIG. 5), which are located on (supported by) an inner surface (underside) 406 of the panel 400 and are configured for engagement with the actuation assembly 500 to facilitate reconfiguration of the vehicle console 1000 between the first configuration (FIG. 1) and the second configuration (FIG. 2) via repositioning of the panel 400 between the upper vertical position and the lower vertical position. More specifically, the panel 400 includes (first and second) outer anchor members 404*oi*, 404*oii* and an inner anchor member 404*i*, which is located between the outer anchor members 404*oi*, 404*oii*. As described in further detail below, the actuation assembly 500 is pivotable in relation to the outer anchor members 404*oi*, 404*oii* and slidable (e.g., linearly movable) in relation to the inner anchor member 404*i*.

While the anchor members 404 are each configured as a linear (or generally linear) track 408 in the particular embodiment illustrated, it should be appreciated that the particular configuration of the anchor members 404 may be altered in various embodiments without departing from the scope of the present disclosure. For example, it is envisioned that each of the outer anchor members 404*oi*, 404*oii* may be configured as an eyelet, a yoke, or the like. Additionally, while anchor members 404 are illustrated as being integrally (e.g., monolithically, unitarily) formed with the panel 400 in the particular embodiment illustrated, it is also envisioned that the panel 400 and the anchor members 404 may be formed as discrete components that may be connected together in any suitable manner. For example, it is envisioned that the panel 400 and the anchor members 404 may be mechanically connected (secured) via one or more fasteners (e.g., pins, rivets, screws, etc.), either fixedly or removably, that the panel 400 and the anchor members 404 may be adhesively connected (secured), that the panel 400 and the anchor members 404 may be heat staked together, etc.

Figure 4:
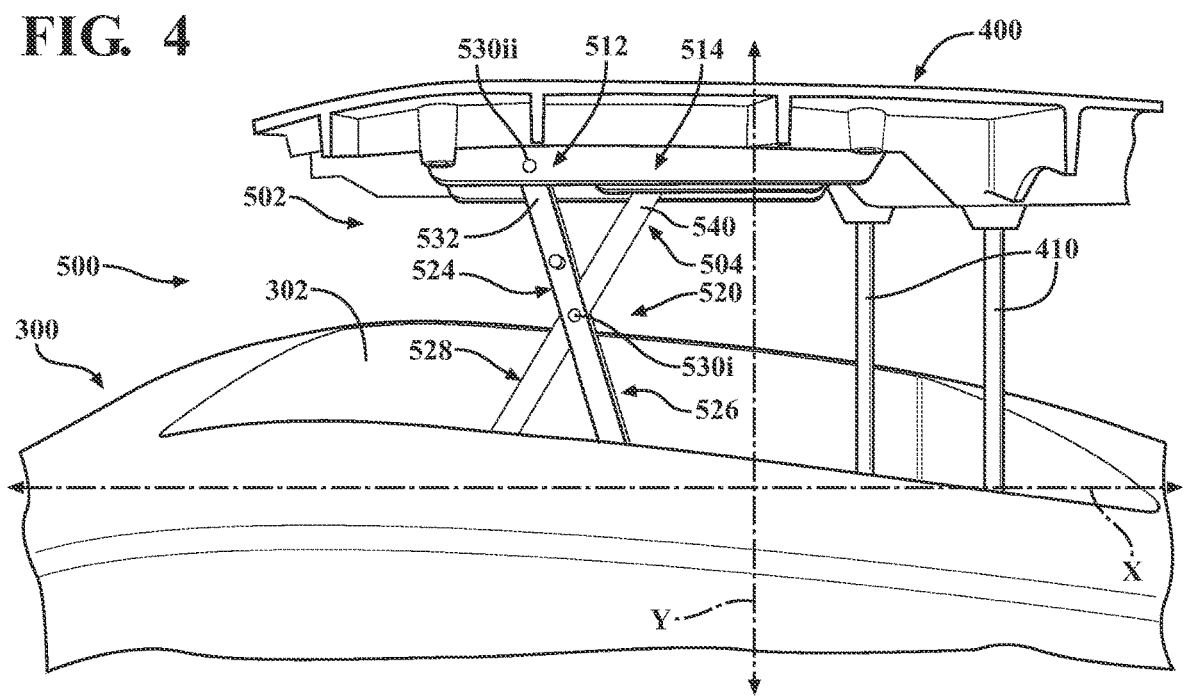
FIG. 4 is a side, perspective view of the vehicle console.
Figure 5:
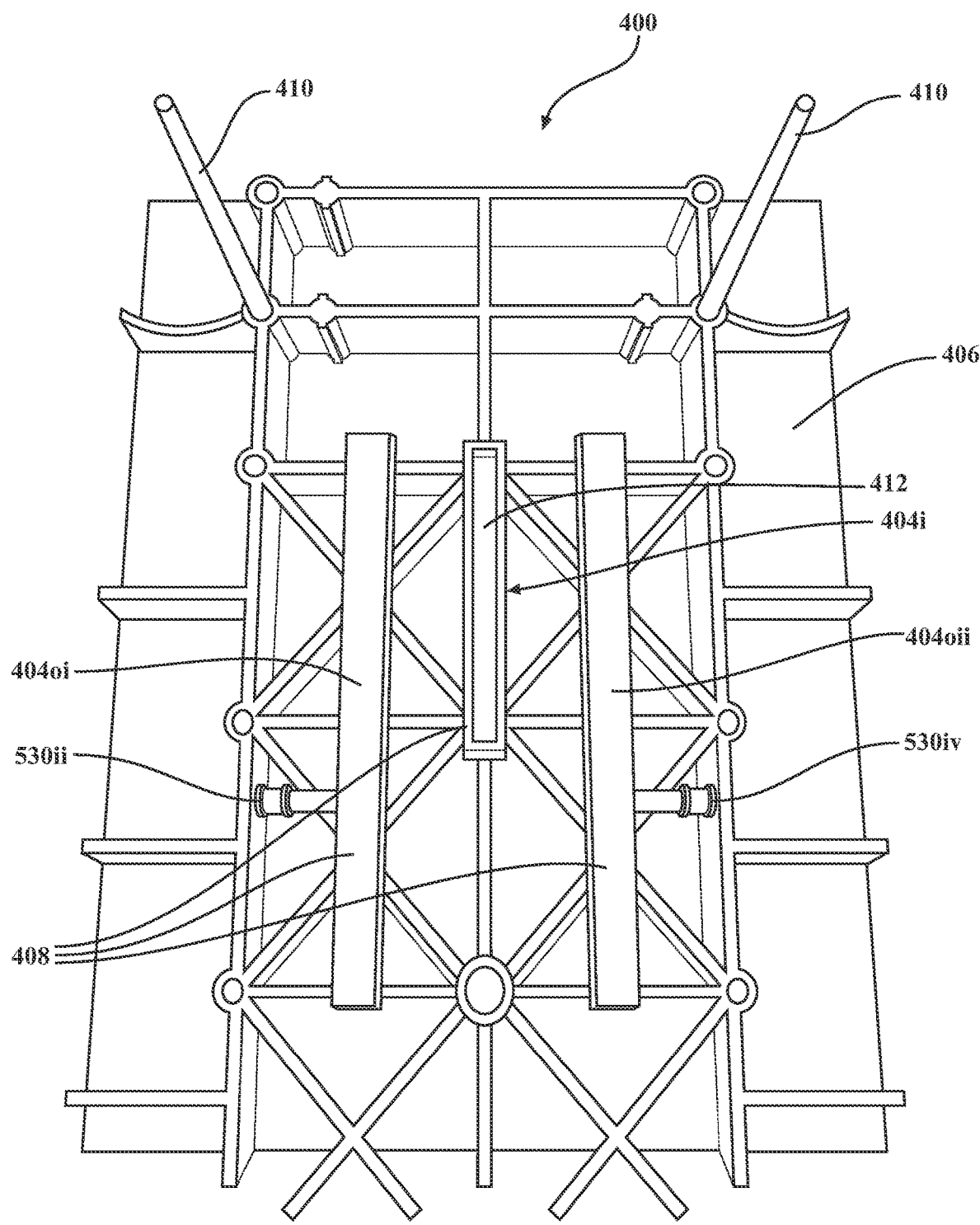
FIG. 5 is a bottom, perspective view of the panel.

In certain embodiments, such as that seen in FIGS. 4 and 5, for example, it is envisioned that the panel 400 may include one or more guideposts 410, which support vertical linear movement of the panel 400 so as to inhibit (if not entirely prevent) lateral movement (e.g., rattling, shaking) of the panel 400, thereby stabilizing the panel 400 and facilitating uniform (smooth) movement thereof during reconfiguration of the vehicle console 1000 between the first configuration (FIG. 1) and the second configuration (FIG. 2). In such embodiments, it is envisioned that the guideposts 410 may be either fixed or non-fixed (e.g., collapsible) in configuration. For example, in the context of fixed guideposts 410, it is envisioned that the housing 300 may include corresponding openings (not shown) (e.g., in the bottom wall 312 thereof) that are configured to receive the guideposts 410 during reconfiguration of the vehicle console 1000 from the first configuration into the second configuration. In the context of non-fixed guideposts 410, however, it is envisioned that the guideposts 410 may telescopically collapse and expand (e.g., under the influence of an internal biasing member) during reconfiguration of the vehicle console 1000 between the first configuration and the second configuration, thereby obviating the need for the aforementioned openings in the housing 300.

Although shown as including two guideposts 410 in the particular embodiment illustrated, it is envisioned that the particular number of guideposts 410 may be varied in alternate embodiments without departing from the scope of the present disclosure. As such, embodiments including both greater and fewer numbers of guideposts 410 are also envisioned herein.

With reference now to FIGS. 4-7 in particular, the actuation assembly 500 will be discussed, which includes: a scissor lift 502 having an upper (first) end 504 and a lower (second) end 506; a base 508; and a drive mechanism 510. The actuation assembly 500 is positioned (located) within the inner chamber 302 and is (directly) connected to the panel 400. As described in detail below, the actuation assembly 500 facilitates movement of the panel 400 between the upper vertical position (FIG. 1) and the lower vertical position (FIG. 2) and, thus, reconfiguration of the vehicle console 1000 between the first configuration and the second configuration, during which the actuation assembly 500 expands and contracts both horizontally (along the axis X) and vertically (along the axis Y). For the purpose of clarity, to better illustrate the components and functionality of the actuation system 500, in FIGS. 4, 6, and 7, the actuation assembly 500 is shown in a hyperextended configuration in which the panel 400 is located vertically above the housing 300 (along the axis Y) in position that lies outside the normal range of motion. It envisioned, however, that the hyperextended configuration may be realized via operation of the control panel 600 (FIGS. 1, 2) and utilized in order to provide access to the inner chamber 302, the actuation mechanism 500, etc., to facilitate assembly, installation, repair, maintenance, and the like.

The upper end 504 of the scissor lift 502 is pivotably and linearly (axially) movable in relation to the panel 400 (along the axis X) and the lower end 506 of the scissor lift 502 is pivotably and linearly (axially) movable in relation to the housing 300 (along the axis X). More specifically, the upper end 504 of the scissor lift 502 is pivotably connected to the panel 400 at a (first, pivotable) interface 512 (FIG. 4) and is linearly movable in relation to the panel 400 along a (second, slidable) interface 514, and the lower end 506 of the scissor lift 502 is pivotably connected to the base 508 at a third interface 516 and pivotably connected to the drive mechanism 510 at a fourth interface 518.

In various embodiments of the disclosure, it is envisioned that the panel 400 and the scissor lift 502 (e.g., the upper end 504 thereof) may be configured for releasable connection to allow for removal of the panel 400 (e.g., to facilitate access to the inner chamber 302, the actuation mechanism 500, etc.). For example, it is envisioned that the panel 400 and the scissor lift 502 may be configured for connection in a snap fit (e.g., an interference fit) arrangement, that the panel 400 and the scissor lift 502 may be mechanically connected (secured) via one or more fasteners (e.g., pins, rivets, screws, etc.), or the like. Additionally, or alternatively, it is envisioned that the housing 300 may include a removable access panel (e.g., in the bottom wall 312 (FIG. 6) or a sidewall 314 thereof) and/or a removable bezel that is supported by the housing 300 and/or the panel 400 (e.g., such that the removable bezel circumscribes the panel 400).

In the particular embodiment illustrated, the scissor lift 502 includes an upper (first) scissor assembly 520 and a lower (second) scissor assembly 522 that is pivotably connected to the upper scissor assembly 520 such that the scissor assemblies 520, 522 are positioned in adjacent (vertical) relation along the axis Y. Although shown as including two scissor assemblies 520, 522 in the particular embodiment illustrated, it should be appreciated that the particular number of scissor assemblies 520, 522 may be varied in alternate embodiments without departing from the scope of the present disclosure (e.g., depending upon the style of the passenger vehicle 10, spatial constraints, the particular location of the vehicle console 1000, the size of the housing 300, etc.). As such, embodiments including both greater and fewer numbers of scissor assemblies 520, 522 are also envisioned herein.

The upper scissor assembly 520 is connected to the panel 400 and includes: a first leg 524; a second leg 526; and a third leg 528. The first leg 524 and the second leg 526 extend in parallel (or generally parallel) relation to each other, and the third leg 528 is located therebetween and extends transversely (e.g., crosswise) in relation thereto. In the particular embodiment illustrated, the legs 524, 526, 528 are pivotably connected by a (first) pivot member 530*i*, which extends through the legs 524, 526, 528 (e.g., to increase stability of the upper scissor assembly 520, reduce lateral movement of the upper scissor assembly 520 along the axis Z (FIG. 7), etc.). Embodiments devoid of the pivot member 530*i* would not be beyond the scope of the present disclosure, however.

The first leg 524 includes an upper end 532 that pivotably engages (is connected to) the panel 400 (e.g., the outer anchor member 404*oi* (FIG. 4)) via a (second) pivot member 530*ii* and a lower end 534 that pivotably engages (is connected to) the lower scissor assembly 522 via a (third) pivot member 530*iii*. The second leg 526 includes an upper end 536 that pivotably engages (is connected to) the panel 400 (e.g., the outer anchor member 404*oii*) via a (fourth) pivot member 530*iv* and a lower end 538 that pivotably engages (is connected to) the lower scissor assembly 522 via a (fifth) pivot member 530*v*. The third leg 528 includes an upper end 540 that slidably engages (contacts) the panel 400 (e.g., the inner anchor member 404*i*) and a lower end 542 that pivotably engages (is connected to) the lower scissor assembly 522, as described in further detail below.

In the particular embodiment illustrated, the upper end 540 of the third leg 528 is configured for positioning within (is received by) a groove 412 (FIG. 5) defined by the inner anchor member 404*i*. The groove 412 acts as a guide that directs movement of the third leg 528 during reconfiguration of the vehicle console 1000 between the first configuration (FIG. 1) and the second configuration (FIG. 2) to inhibit (if not entirely prevent) lateral movement (e.g., rattling, shaking) of the third leg 528, thereby stabilizing the third leg 528 and facilitating uniform (smooth) movement of the actuation assembly 500 during reconfiguration of the vehicle console 1000 between the first configuration and the second configuration. Embodiments are also envisioned, however, in which the upper end 540 of the third leg 528 may include a bearing, a roller, or the like to further facilitate linear movement of the third leg 528 in relation to the panel 400 as are embodiments in which the third leg 528 may be free-floating and spaced (vertically) from the panel 400.

The lower scissor assembly 522 is connected to the upper scissor assembly 520, the base 508, and the drive mechanism 510 and includes: a first leg 544; a second leg 546; and a third leg 548. The first leg 544 and the second leg 546 extend in parallel (or generally parallel) relation to each other, and the third leg 548 is located therebetween and extends transversely (e.g., crosswise) in relation thereto. Additionally, the first leg 544 and the second leg 546 extend in parallel (or generally parallel) relation to the first leg 524 and the second leg 526 of the upper scissor assembly 520, and the third leg 548 extends in parallel (or generally parallel) relation to the third leg 528 of the upper scissor assembly 520. In the particular embodiment illustrated, the legs 544, 546, 548 are pivotably connected by a (sixth) pivot member 530*vi*, which extends through the legs 544, 546, 548 (e.g., to increase stability of the lower scissor assembly 522, reduce lateral movement of the lower scissor assembly 522 along the axis Z (FIG. 7), etc.). Embodiments devoid of the pivot member 530*vi* would not be beyond the scope of the present disclosure, however.

The first leg 544 includes an upper end 550 that pivotably engages (is connected to) the lower end 542 of the third leg 528 of the upper scissor assembly 520 via a (seventh) pivot member 530*vii* and a lower end 552 that pivotably engages (is connected to) the drive mechanism 510 via an (eighth)

pivot member 530*viii*. The second leg 546 includes an upper end 554 that pivotably engages (is connected to) the lower end 542 of the third leg 528 of the upper scissor assembly 520 via a (ninth) pivot member 530*ix* and a lower end 556 that pivotably engages (is connected to) the drive mechanism 510 via a (tenth) pivot member 530*x*. The third leg 548 includes an upper end 558 that pivotably engages (is connected to) the lower ends 534, 538 of the legs 524, 526 of the upper scissor assembly 520 via pivot members 530*iii*, 530*v*, respectively, and a lower end 560 that pivotably engages (is connected to) the base 508 via an (eleventh) pivot member 530*xi*.

In the particular embodiment illustrated, each pivot member 530 is configured as a pin 562. It should be appreciated, however, that the pivot members 530 may be configured in any manner suitable for the intended purpose of establishing the pivotable connections between the corresponding, appurtenant components. For example, it is envisioned that the pivot members 530 may be configured as rivets, dowels, screws, or the like, and that the pivot members 530 may be either identical or non-identical in configuration. Additionally, while each of the pivot members 530*i*-530*xi* is illustrated as being a discrete component of the vehicle console 1000 in the particular embodiment illustrated, it is envisioned that the number of pivot members 530 may be reduced in certain embodiments by replacing a pair of pivot members 530 with a single pivot member 530. For example, it is envisioned that a single pivot member 530 may be utilized to connect the legs 524, 526 of the upper scissor assembly 520 to the panel 400, that a single pivot member 530 may be utilized to connect the third leg 528 of the upper scissor assembly 520 to the respective first and second legs 544, 546 of the lower scissor assembly 522, that a single pivot member 530 may be utilized to connect the legs 544, 546 of the lower scissor assembly 522 to the drive mechanism 510, etc.

The base 508 includes a platform 564 that is axially fixed (e.g., along the axis X), but pivotably connected, to the third leg 548 of the lower scissor assembly 522. The base 508 also support movement of the drive mechanism 510 during reconfiguration of the vehicle console 1000 between the first configuration (FIG. 1) and the second configuration (FIG. 2). More specifically, the platform 564 defines a channel 566 (FIG. 6) that is configured to slidably receive the drive mechanism 510 such that the drive mechanism 510 is linearly movable within the channel 566 (e.g., in parallel (or generally parallel) relation to the axis X), as described in further detail below.

In the particular embodiment illustrated, the base 508 and the housing 300 are configured as discrete components of the vehicle console 1000 that may be connected together in any suitable manner. For example, it is envisioned that the base 508 and the housing 300 may be mechanically connected (secured) via one or more fasteners (e.g., pins, rivets, screws, etc.), either fixedly or removably, that the base 508 and the housing 300 may be adhesively connected (secured), that the base 508 and the housing 300 may be heat staked together, etc. Embodiments are also envisioned, however, in which the base 508 and the housing 300 may be integrally (e.g., monolithically, unitarily) formed, such as, for example, via injection molding, as are embodiments in which the base 508 may be eliminated entirely. For example, in certain embodiments, it is envisioned that the actuation assembly 500 (e.g., the lower scissor assembly 522) may be pivotably and slidably connected to (supported by) the bottom wall 312 of the housing 300. More specifically, in such embodiments, it is envisioned that the channel 566 may be formed in (defined by) the bottom wall 312 of the housing 300.

The drive mechanism 510 is located within the housing 300 (e.g., the inner chamber 302) and is connected to the actuation assembly 500 (e.g., to the lower scissor assembly 522) such that the lower scissor assembly 522 extends between the upper scissor assembly 520 and the drive mechanism 510. The actuation assembly 500 thus operatively (e.g., indirectly) connects the panel 400 to the drive mechanism 510. The drive mechanism 510 is configured to cause expansion and contraction of the actuation assembly 500 and thereby facilitate reconfiguration of the vehicle console 1000 between the first configuration (FIG. 1) and the second configuration (FIG. 2) and includes: a motor 568; a drive shaft 570 that is connected to the motor 568 such that operation of the motor 568 causes rotation of the drive shaft 570; a pinion 572 (e.g., a gear 574) that is supported by (connected to) the drive shaft 570 such that rotation of the drive shaft 570 causes corresponding rotation of the pinion 572; and a rack 576 that is in engagement (contact) with the pinion 572. As illustrated in the figures and expanded upon in further detail below, in certain embodiments, the drive mechanism 510 is configured such that the rack 576 is positioned adjacent to an inner wall of the housing 300.

In the particular embodiment illustrated, the motor 568 draws electrical power through a power cable 578, which may be connected to any suitable power source (e.g., a wiring harness in the passenger vehicle 10). Additionally, or alternatively, it is envisioned that the motor 568 may be electrically connected to a dedicated power source, such as a battery, which may be positioned in any suitable location, whether located internally within the housing 300 or externally thereof.

The pinion 572 and the rack 576 include corresponding gear teeth 580, 582, respectively, which are configured for engagement such that rotation of the pinion 572 causes corresponding linear movement (e.g., sliding) of the rack 576 (along the axis X). During linear movement, the rack 576 is (slidably) supported within the channel 566 defined by the platform 564, which inhibits (if not entirely prevents) lateral movement (e.g., rattling, shaking) of the rack 576, thereby stabilizing the rack 576 and facilitating uniform (smooth) movement of the drive mechanism 510 and the actuation assembly 500 during reconfiguration of the vehicle console 1000 between the first configuration (FIG. 1) and the second configuration (FIG. 2). To further stabilize the rack 576 and facilitate uniform movement thereof, it is envisioned that the platform 564 and the rack 576 may include corresponding support members (structures). For example, it is envisioned that the rack 576 may include flanges (or other such extensions) that are configured for slidable receipt within corresponding flutes (or other such grooves) defined by the platform 564 (e.g., within or adjacent to the channel 566).

The rack 576 extends in parallel (or generally parallel) relation to the axis X and in orthogonal (or generally orthogonal) relation to the axis Y. The rack 576 defines a length LR (FIG. 6) and pivotably engages (is connected to) the lower end 506 of the scissor lift 502. More specifically, the rack 576 pivotably engages (is connected to) the lower scissor assembly 522 (e.g., the respective lower ends 552, 556 of the legs 544, 546) via the pivot members 530*viii*, 530*x*, respectively. As a result, linear movement of the rack 576 causes corresponding linear movement of the lower end 506 of the scissor lift 502 (e.g., the respective lower ends 552, 556 of the legs 544, 546), which causes expansion and contraction of the actuation assembly 500 (e.g., the scissor lift 502) along the axes X, Y. More specifically, movement of the rack 576 in a first direction (e.g., away from the lower end 560 of the third leg 548), which is identified by arrow 1 (FIG. 6), causes (horizontal) expansion of the actuation assembly 500 along the axis X and (vertical) contraction of the actuation assembly 500 along the axis Y in the direction identified by arrow 2, whereas movement of the rack 576 in a second direction (e.g., towards the lower end 560 of the third leg 548), which is identified by arrow 3, causes (horizontal) contraction of the actuation assembly 500 along the axis X and (vertical) expansion of the actuation assembly 500 along the axis Y in the direction identified by arrow 4.

In the particular embodiment illustrated, the housing 300 includes an aperture 316 (FIG. 6) that is provided in a rear wall 318 thereof that is configured to receive the rack 576. More specifically, during reconfiguration of vehicle console 1000 from the first configuration (FIG. 1) into the second configuration (FIG. 2), as the actuation assembly 500 contracts vertically (along the axis Y) and expands axially (along the axis X), the rack 576 extends into the aperture 316 (and the rear wall 318). The aperture 316 thus facilitates (accommodates) linear movement of the rack 576. The rack 576 and the housing 300 (e.g., the rear wall 318) are configured, however, so as to conceal the rack 576 when the rack 576 is positioned within the aperture 316. The rack 576 thus remains internal to the housing 300 and does not extend outwardly beyond the housing 300, which prevents the rack 576 from being seen within the seating area of the passenger vehicle 10 (e.g., from the back seat). Embodiments devoid of the aperture 316 are also envisioned herein, however. For example, it is envisioned that the rack 576 may be shortened and/or that the particular number of scissor assemblies 520, 522 comprising the scissor lift 502 may be varied. More specifically, by increasing the number of scissor assemblies 520, 522, it is envisioned that the length LR of the rack 576 may be reduced, thereby obviating any need for the aperture 316.

In certain embodiments, the actuation assembly 500 may further include one or more stops 584 that are configured to restrict movement of the actuation assembly 500 and thereby inhibit (if not entirely prevent) over-expansion of the actuation assembly 500 during reconfiguration of the vehicle console 1000 from the second configuration (FIG. 2) into the first configuration (FIG. 1). For example, in the particular embodiment illustrated, the actuation assembly 500 includes a stop 584 that is configured for engagement (contact) with the scissor lift 502 (e.g., the lower scissor assembly 522) when the vehicle console 1000 is in the first configuration (FIG. 1) and the panel 400 is in the upper vertical position. More specifically, the stop 584 extends through the third leg 548 of the lower scissor assembly 522 so as to facilitate engagement (contact) between the stop 584 and the legs 544, 546 upon reaching a predetermined threshold for vertical expansion of the actuation assembly 500 (along the axis Y).

Although shown as including a single stop 584 in the particular embodiment illustrated, it is envisioned that the particular number of stops 584 may be varied in alternate embodiments without departing from the scope of the present disclosure. As such, embodiments including one or more additional stops 584 are also envisioned herein. For example, it is envisioned that the actuation assembly 500 may include a second stop 584 that is configured for engagement (contact) with the upper scissor assembly 520.

The control panel 600 (FIGS. 1, 2) is connected to (is in communication with) the drive mechanism 510 to cause operation thereof. More specifically, the control panel 600 is configured and utilized to active the motor 568, which causes rotation of the drive shaft 570 and the pinion 572 and, thus, linear movement of the rack 576, thereby reconfiguring the vehicle console 1000 between the first configuration (FIG. 1) and the second configuration (FIG. 2). While the control panel 600 is shown as being positioned forwardly of the housing 300 and adjacent (or generally adjacent) to the cupholder(s) 200 in the particular embodiment illustrated, it should be appreciated that the control panel 600 may be located in any suitable position (e.g., depending upon the style of the vehicle, spatial requirements, etc.).

Figure 6:
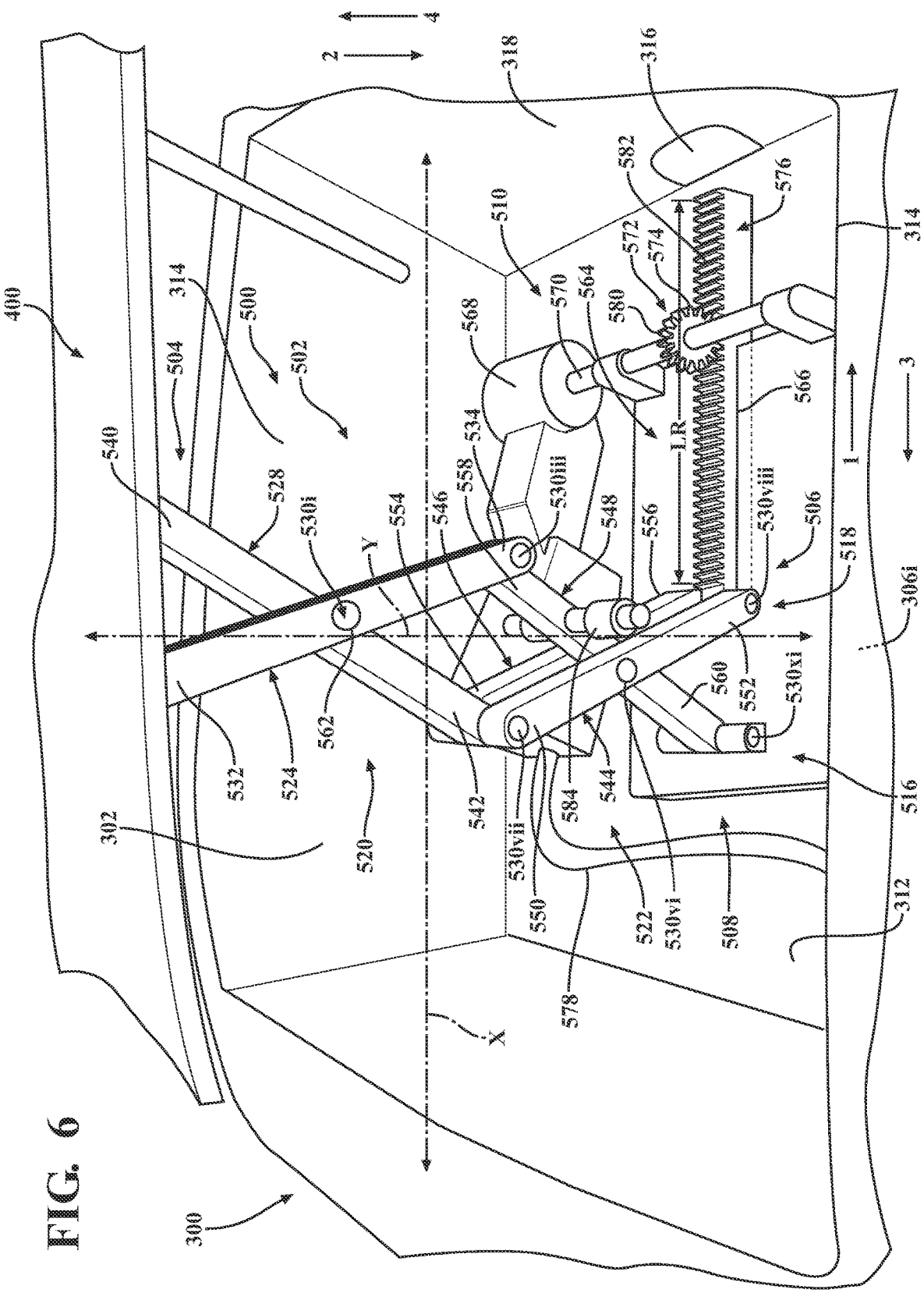
FIG. 6 is a top, perspective view of the actuation assembly.

With reference now to FIGS. 1-7, use and operation of the vehicle console 1000 will be discussed. When necessary or desired, the vehicle console 1000 can be reconfigured from the first configuration (FIG. 1) into the second configuration (FIG. 2) to allow for accommodation of the article(s) A within the external storage compartment 306ii via activation of the actuation assembly 500. More specifically, the motor 568 (FIG. 7) is engaged (activated) via the control panel 600 (FIGS. 1, 2), which causes rotation of the drive shaft 570 and the pinion 572 and, thus, linear movement of the rack 576 in the direction identified by arrow 1 (FIG. 6).

Movement of the rack 576 causes corresponding movement of the respective lower ends 552, 556 of the legs 544, 546 of the lower scissor assembly 522, which results in (horizontal) expansion of the lower scissor assembly 522 (along the axis X) and (vertical) contraction of the lower scissor assembly 522 (along the axis Y). During expansion and contraction of the lower scissor assembly 522, the lower ends 552, 556 of the legs 544, 566 pivot in relation to the rack 576 about the pivot members 530viii, 530x, respectively, and the lower end 560 of the third leg 548 pivots in relation to the platform 564 about the pivot member 530xi.

By virtue of the pivotable connection between the lower scissor assembly 522 and the upper scissor assembly 520, expansion and contraction of the lower scissor assembly 522 causes corresponding expansion and contraction of the upper scissor assembly 520 (e.g., along the respective axes X, Y) and, thus, the scissor lift 502. During expansion and contraction of the upper scissor assembly 520, the upper ends 550, 554, 558 of the legs 544, 546, 548 and the lower ends 534, 538, 542 of the legs 524, 526, 528 pivot in relation to each other via the pivotable connections established by the pivot members 530iii, 530v, 530vii, 530ix. Additionally, the upper ends 532, 536 of the legs 524, 526 pivot in relation to the panel 400 (e.g., the outer anchor members 404oi, 404oii) about the pivot members 530ii, 530iv (FIG. 5), respectively, and the upper end 540 of the third leg 528 moves linearly in relation to the panel 400 (e.g., the inner anchor member 404i). More specifically, in the particular embodiment illustrated, the upper end 540 of the third leg 528 moves (slides) linearly within the groove 412 (FIG. 5) defined by the inner anchor member 404i.

As the scissor lift 502 expands along the axis X and contracts along the axis Y, by virtue of the pivotable connection between the upper scissor assembly 520 and the panel 400 established by the pivot members 530ii, 530iv (FIG. 5), the panel 400 moves from the upper vertical position into the lower vertical position, thereby exposing (revealing, creating, defining) the external storage compartment 306ii (FIG. 2) and allowing for accommodation of the article(s) A therein.

When necessary or desired (e.g., following removal of the article(s) A from the external storage compartment 306ii), the vehicle console 1000 can be returned to the first configuration. More specifically, the motor 568 (FIG. 6) is again engaged (activated) via the control panel 600 (FIGS. 1, 2), which causes rotation of the drive shaft 570 and the pinion 572 and, thus, linear movement of the rack 576 in the direction identified by arrow 3 (FIG. 6).

Movement of the rack 576 causes corresponding movement of the respective lower ends 552, 556 of the legs 544, 546 of the lower scissor assembly 522 and, thus, (horizontal) contraction of the lower scissor assembly 522 (along the axis X) and (vertical) expansion of the lower scissor assembly 522 (along the axis Y). During contraction and expansion of the lower scissor assembly 522, the respective lower ends 552, 556 of the legs 544, 566 again pivot in relation to the rack 576 and the lower end 560 of the third leg 548 again pivots in relation to the platform 564.

By virtue of the pivotable connection between the lower scissor assembly 522 and the upper scissor assembly 520, contraction and expansion of the lower scissor assembly 522 causes corresponding contraction and expansion of the upper scissor assembly 520 and, thus, the scissor lift 502. During contraction and expansion of the upper scissor assembly 520, the upper ends 550, 554, 558 of the legs 544, 546, 548 and the lower ends 534, 538, 542 of the legs 524, 526, 528 again pivot in relation to each other. Additionally, the upper ends 532, 536 of the legs 524, 526 pivot in relation to the panel 400 (e.g., the outer anchor members 404oi, 404oii), respectively, and the upper end 540 of the third leg 528 moves (slides) linearly in relation to the panel 400 (e.g., within the groove 412 (FIG. 5) defined by the inner anchor member 404i).

As the scissor lift 502 contracts along the axis X and expands along the axis Y, the panel 400 moves from the lower vertical position into the upper vertical position, thereby returning the vehicle console 1000 to the first configuration and concealing the external storage compartment 306ii (FIG. 2).

Figure 8:
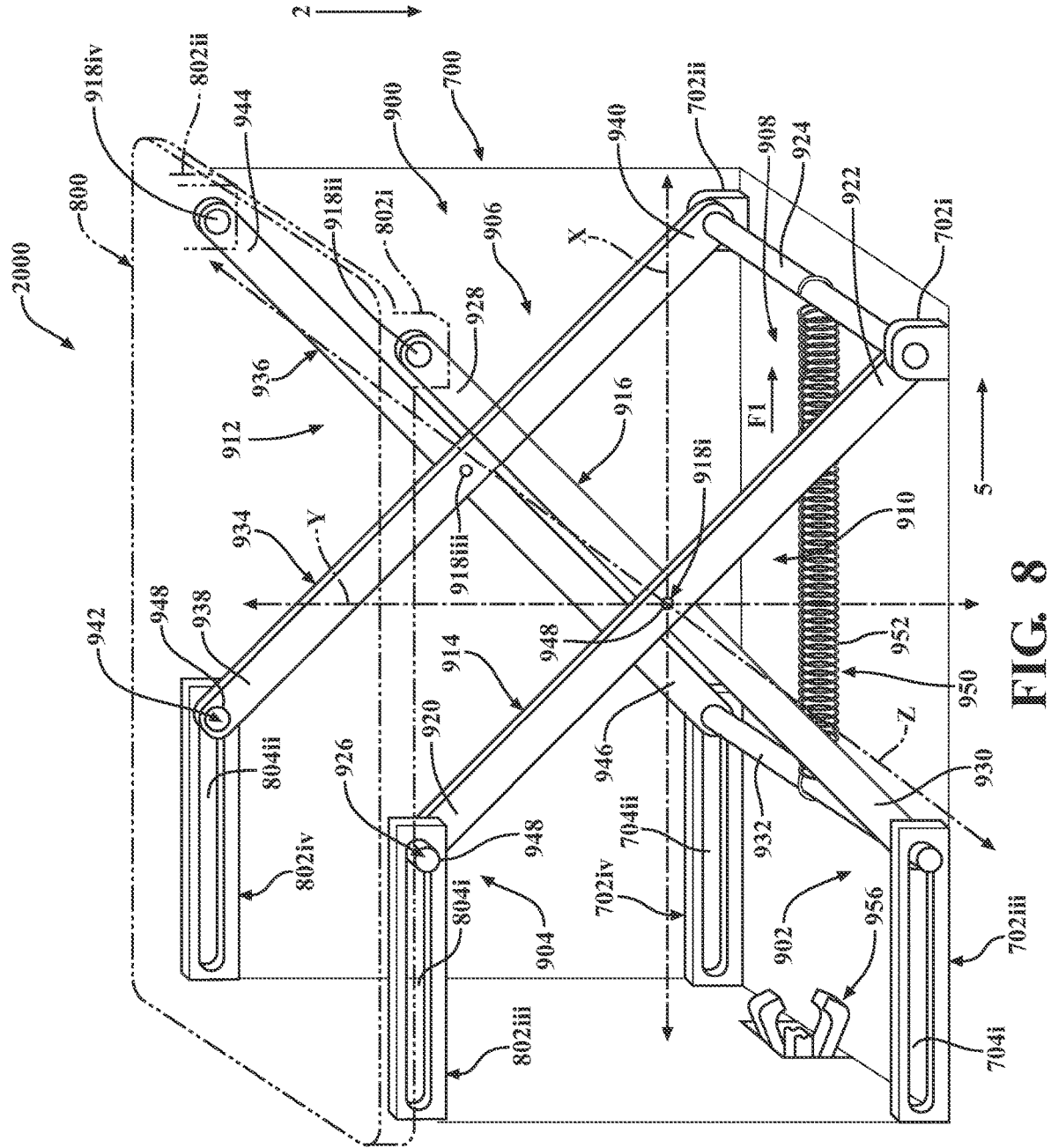
FIG. 8 is a side, perspective view of an alternate embodiment of the vehicle console including a biasing member.

With reference now to FIG. 8, an alternate embodiment of the vehicle console is illustrated, which is identified by the reference character 2000. The vehicle console 2000 is substantially similar in both structure and function to the vehicle console 1000 discussed above (FIGS. 1-7) and, accordingly, in the interest of brevity, will only be discussed with respect to any differences therefrom. As such, identical reference characters will be utilized to refer to elements, structures, features, etc., common to the vehicle consoles 1000, 2000. As described in detail below, in addition to the main body portion 100 (FIG. 1), the cupholder(s) 200, and the control panel 600, the vehicle console 2000 includes: a housing 700; a panel 800; and an actuation assembly 900.

The housing 700 is substantially similar to the aforedescribed housing 300, but for omission of the aperture 316 (FIG. 6) and the inclusion of a plurality (series) of anchor members 702 that are configured for engagement with a lower (first) end 902 of the actuation assembly 900. More specifically, the housing 700 includes first and second anchor members 702i, 702ii, respectively, which pivotably engage (are connected to) the actuation assembly 900, and third and fourth anchor members 702iii, 702iv, which slidably engage (contact) the actuation assembly 900 via respective grooves 704i, 704ii that extend in parallel (or generally parallel) relation to the axis X.

The panel 800 includes a corresponding plurality (series) of anchor members 802 that are configured for engagement with a second (upper) end 904 of the actuation assembly 900. More specifically, the panel 800 includes first and second anchor members 802i, 802ii, respectively, which pivotably engage (are connected to) the actuation assembly 900, and respective third and fourth anchor members 802iii, 802iv, which slidably engage (contact) the actuation assembly 900 via respective grooves 804i, 804ii that extend in parallel (or generally parallel) relation to the axis X and the grooves 704i, 704ii in the anchor members 702iii, 702iv.

While the anchor members 702, 802 are respectively illustrated as being integrally (e.g., monolithically, unitarily) formed with the housing 700 and the panel 800 in the particular embodiment illustrated, it is also envisioned that the anchor members 702, 802 may be formed as discrete components that are configured for connection to the housing 700 and the panel 800, respectively, in any suitable manner. For example, it is envisioned that the anchor members 702, 802 may be mechanically connected (secured) to the housing 700 and the panel 800, respectively, via one or more fasteners (e.g., pins, rivets, screws, etc.), either fixedly or removably, that the anchor members 702, 802 may be adhesively connected (secured) to the housing 700 and the panel 800, respectively, that the anchor members 702, 802 may be heat staked to the housing 700 and the panel 800, respectively, etc.

The actuation assembly 900 includes a scissor lift 906 and a drive mechanism 908. As discussed above in connection with the vehicle console 1000, the actuation assembly 900 is configured to facilitate reconfiguration of the vehicle console 2000 between the first configuration (FIGS. 1, 8) and the second configuration (FIG. 2) to thereby define the external storage compartment 306ii and allow for accommodation of the article(s) A therein.

In contrast to the scissor lift 502 discussed in connection with the vehicle console 1000 (FIGS. 1-7), the scissor lift 906 includes respective first and second scissor assemblies 910, 912, which extend between the panel 800 and the housing 700 and are arranged in adjacent (or generally adjacent) (e.g., side-by-side) relation along the axis Z. While the scissor lift 906 is shown as including two scissor assemblies 910, 912 in the particular embodiment illustrated, it should be appreciated that the particular number of scissor assemblies 910, 912 may be varied in alternate embodiments without departing from the scope of the present disclosure (e.g., depending upon the style of the passenger vehicle 10, spatial constraints, the particular location of the vehicle console 2000, the size of the housing 700, etc.). As such, embodiments of the vehicle console 2000 including both greater and fewer numbers of scissor assemblies 910, 912 are also envisioned herein.

The scissor assembly 910 includes respective first and second legs 914, 916, which extend transversely (e.g., crosswise) in relation to each other. In the particular embodiment illustrated, the legs 914, 916 are pivotably connected by a first pivot member 918i, which extends through the legs 914, 916 (e.g., to increase stability of the scissor assembly 910, reduce lateral movement of the scissor assembly 910 along the axis Z, etc.). Embodiments devoid of the first pivot member 918i would not be beyond the scope of the present disclosure, however.

The first leg 914 includes an upper end 920 that slidably engages (contacts) the panel 800 (e.g., the anchor member 802iii) and a lower end 922 that pivotably engages (is connected to) the housing 700 (e.g., the anchor member 702i) via a first axle (shaft) 924, which extends through the lower end 922 of the first leg 914 the anchor member 702i. More specifically, the upper end 920 of the first leg 914 includes a first detent 926 that is received by (positioned within) the groove 804i defined by the anchor member 802iii such that the first detent 926 slides within the groove 804i and moves in linear relation to the anchor member 802iii and the panel 800 during reconfiguration of the vehicle console 2000 between the first configuration and the second configuration.

The second leg 916 includes an upper end 928 that pivotably engages (is connected to) the panel 800 (e.g., the anchor member 802*i*) via a second pivot member 918*ii* and a lower end 930 that slidably engages (contacts) the housing 700 (e.g., the anchor member 702*iii*) via a second axle 932. More specifically, the second axle (shaft) 932 extends through the lower end 930 of the second leg 916 and the second axle 932 is received by (positioned within) the groove 704*i* such that the second axle 932 slides within the groove 704*i* and moves in linear relation to the anchor member 702*iii* and the housing 700 during reconfiguration of the vehicle console 2000 between the first configuration and the second configuration.

The scissor assembly 912 includes respective first and second legs 934, 936, which extend transversely (e.g., crosswise) in relation to each other. In the particular embodiment illustrated, the legs 934, 936 are pivotably connected by a third pivot member 918*iii*, which extends through the legs 934, 936 (e.g., to increase stability of the scissor assembly 912, reduce lateral movement of the scissor assembly 912 along the axis Z, etc.). Embodiments devoid of the third pivot member 918*iii* would not be beyond the scope of the present disclosure, however.

The first leg 934 includes an upper end 938 that slidably engages (contacts) the panel 800 (e.g., the anchor member 802*iv*) and a lower end 940 that pivotably engages (is connected to) the housing 700 (e.g., the anchor member 702*ii*) via the first axle 924, which extends through the lower end 940 of the first leg 934 and the anchor member 702*ii*. More specifically, the upper end 938 of the first leg 934 includes a second detent 942 that is received by (positioned within) the groove 804*ii* defined by the anchor member 802*iv* such that the second detent 942 slides within the groove 804*ii* and moves in linear relation to the anchor member 802*iv* and the panel 800 during reconfiguration of the vehicle console 2000 between the first configuration and the second configuration.

The second leg 936 includes an upper end 944 that pivotably engages (is connected to) the panel 800 (e.g., the anchor member 802*ii*) via a fourth pivot member 918*iv* and a lower end 946 that slidably engages (contacts) the housing 700 (e.g., the anchor member 702*iv*) via the second axle 932. More specifically, the second axle 932 extends through the lower end 946 of the second leg 936 and the anchor member 702*iv* and is received by (positioned within) the groove 704*ii* such that the second axle 932 slides within the groove 704*ii* and moves in linear relation to the anchor member 702*iv* and the housing 700 during reconfiguration of the vehicle console 2000 between the first configuration and the second configuration.

In the particular embodiment illustrated, each of the pivot members 918*i*-918*iv* and the detents 926, 942 is configured as a pin 948. It should be appreciated, however, that the pivot members 918 and the detents 926, 942 may be configured in any manner suitable for the intended purpose of establishing the pivotable and slidable connections between the appurtenant components discussed above. For example, it is envisioned that the pivot members 918 and the detents 926, 942 may be configured as rivets, dowels, screws, or the like, and that the pivot members 918 and the detents 926, 942 may be either identical or non-identical in configuration. Additionally, while each of the pivot members 918 and the detents 926, 942 is illustrated as being a discrete component of the vehicle console 2000 in the particular embodiment illustrated, it is envisioned that the number of pivot members 918 and detents 926, 942 may be reduced in certain embodiments by replacing pairs of pivot members 918 and the detents 926, 942 with single pivot members 918 and a single detent (e.g., the detent 926 or the detent 942). For example, it is envisioned that a single pivot member 918 may be utilized to connect the legs 914, 916 of the scissor assembly 910 to the legs 934, 936 of the scissor assembly 912, that a single pivot member 918 may be utilized to connect the scissor assemblies 910, 912 to the anchor members 800*i*, 800*ii*, respectively, that a single detent (e.g., the detent 926 or the detent 942) may be utilized to connect the scissor assemblies 910, 912 to the anchor members 802*iii*, 802*iv*, etc.

The drive mechanism 908 is located within the housing 700 (e.g., the inner chamber 302) and is connected to the actuation assembly 900 (e.g., to the scissor lift 906). The drive mechanism 908 is configured to expand and contract the actuation assembly 900 and thereby facilitate reconfiguration of the vehicle console 2000 between the first configuration (FIGS. 1, 8) and the second configuration (FIG. 2) and includes a biasing member 950. In contrast to the drive mechanism 510 (FIGS. 6, 7) included in the vehicle console 1000, which facilitates reconfiguration between the first configuration and the second configuration via the pinion 572 and the rack 576 and is devoid of any biasing members or structures, the drive mechanism 908 included in the vehicle console 2000 facilitates reconfiguration between the first configuration and the second configuration via kinetic energy stored in the biasing member 950, as described in further detail below.

Figure 9:
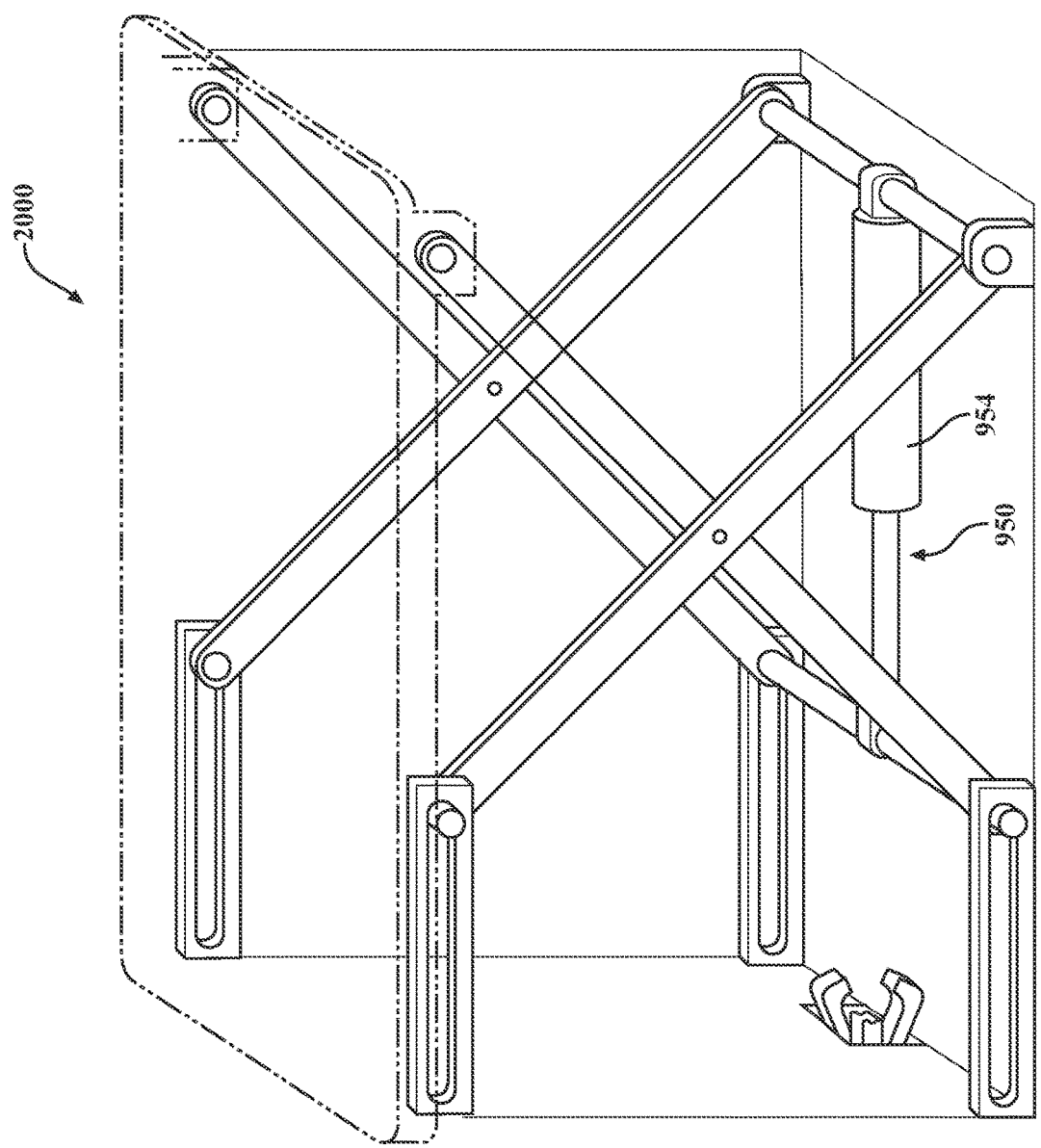
FIG. 9 is a side, perspective view of the vehicle console seen in FIG. 8 shown with an alternate embodiment of the biasing member.

The biasing member 950 extends between the axles 924, 932 in parallel (or generally parallel) relation to the axis X and is configured to bias the vehicle console 2000 towards the first configuration. In the particular embodiment illustrated, the biasing member 950 is configured as a spring 952. It is envisioned, however, that the configuration of the biasing member 950 may be varied in alternate embodiments without departing from the scope of the present disclosure. For example, FIG. 9 illustrates an embodiment of the vehicle console 2000 in which the biasing member 950 is configured as a pneumatic shock 954.

With reference again to FIG. 8, use and operation of the vehicle console 2000 will be discussed. When necessary or desired, the vehicle console 2000 can be reconfigured from the first configuration (FIGS. 1, 8) into the second configuration (FIG. 2) via the (manual) application of force to the panel 800 along the axis Y (e.g., towards the biasing member 950 in the direction identified by arrow 2). The application of force to the panel 800 causes (horizontal) expansion of the scissor assemblies 910, 912 along the axis X and (vertical) contraction of the scissor assemblies 910, 912 along the axis Y, which occurs in unison by virtue of the connection between the scissor assemblies 910, 912 established by the axles 924, 932. During expansion and contraction of the scissor assemblies 910, 912, the legs 914, 934 pivot in relation to the anchor members 702*i*, 702*ii* about the first axle 924 and slide in relation to the anchor members 802*iii*, 802*iv* within the grooves 804*i*, 804*ii*, respectively, and the legs 916, 936 pivot in relation to the anchor members 802*i*, 802*ii* about the pivot members 918*ii*, 918*iv* and slide in relation to the anchor members 702*iii*, 702*iv* within the grooves 704*i*, 704*ii*, respectively. Additionally, expansion of the scissor assemblies 910, 912 along the axis X and contraction of the scissor assemblies 910, 912 along the axis Y results in elongation of the biasing member 950 (along the axis X) and, thus, the storage of kinetic energy in the form of a biasing force F1, which is oriented in the direction identified by arrow 5.

As the scissor assemblies 910, 912 expand along the axis X and contract along the axis Y, the panel 800 moves from the upper vertical position into the lower vertical position, thereby creating (defining) the external storage compartment 306ii (FIG. 2) and allowing for accommodation of the article(s) A therein. Upon reaching the second configuration, the scissor lift 906 releasably engages a retention (locking) mechanism 956, which selectively maintains the position of the scissor lift 906 and, thus, the configuration of the actuation assembly 900 and the vehicle console 2000. More specifically, in the particular embodiment illustrated, the retention mechanism 956 is configured for releasable engagement with the second axle 932.

When necessary or desired (e.g., following removal of the article(s) A (FIG. 2) from the external storage compartment 306ii), the vehicle console 2000 can be returned to the first configuration. More specifically, force is again (manually) applied to the panel 800 along the axis Y (e.g., towards the biasing member 950 in the direction identified by arrow 2), which causes disengagement of the retention mechanism 956 from the second axle 932. Thereafter, the biasing force F1 in the biasing member 950 acts upon the scissor lift 906 to cause (horizontal) contraction of the scissor assemblies 910, 912 along the axis X and (vertical) expansion of the scissor assemblies 910, 912 along the axis Y, which again occurs in unison by virtue of the connection between the scissor assemblies 910, 912 established by the axles 924, 932. During (horizontal) contraction and (vertical) expansion of the scissor assemblies 910, 912, the legs 914, 934 pivot in relation to the anchor members 702i, 702ii about the first axle 924 and slide in relation to the anchor members 802iii, 802iv within the grooves 804i, 804ii, respectively, and the legs 916, 936 pivot in relation to the anchor members 802i, 802ii about the pivot members 918ii, 918iv and slide in relation to the anchor members 702iii, 702iv within the grooves 704i, 704ii, respectively.

As the scissor assemblies 910, 912 contract and expand, the panel 800 moves from the lower vertical position into the upper vertical position, thereby returning the vehicle console 2000 to the first configuration.

Figure 10:
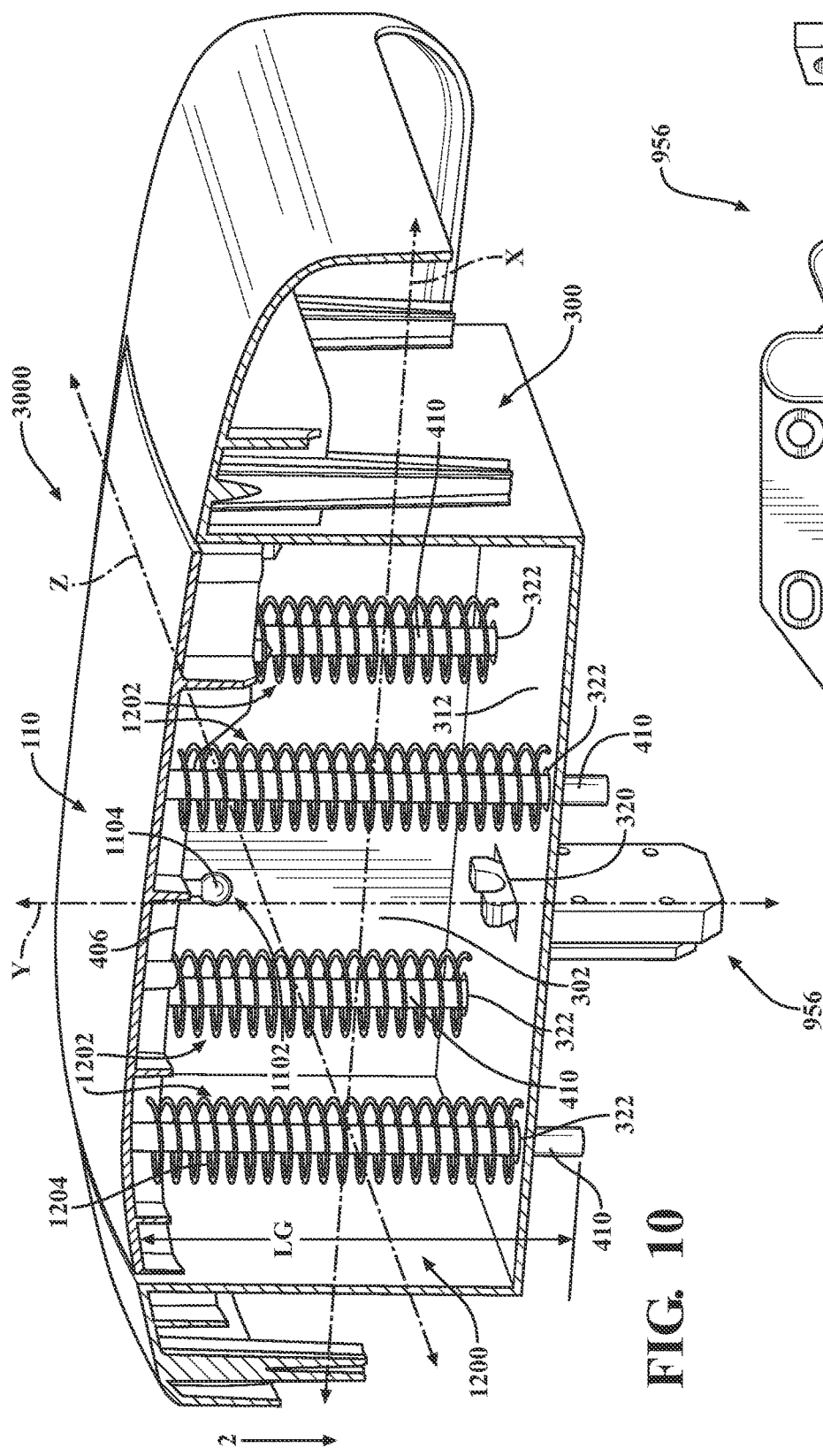
FIG. 10 is a side, cross-sectional, perspective view of an alternate embodiment of the vehicle console shown in the first configuration.
Figure 11:
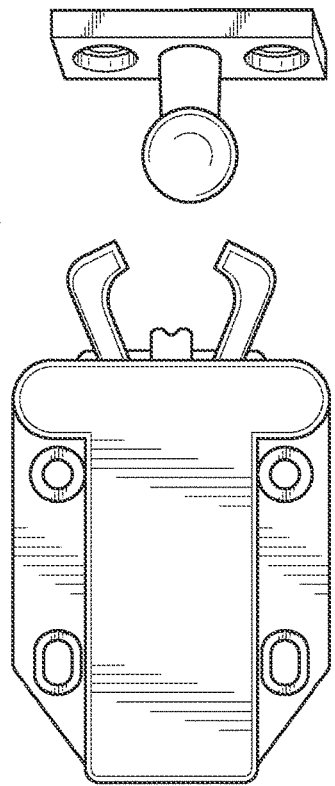
FIG. 11 is an end, perspective view of a retention mechanism configured for use with the embodiments of the vehicle console seen in FIGS. 8-10.
Figure 12:
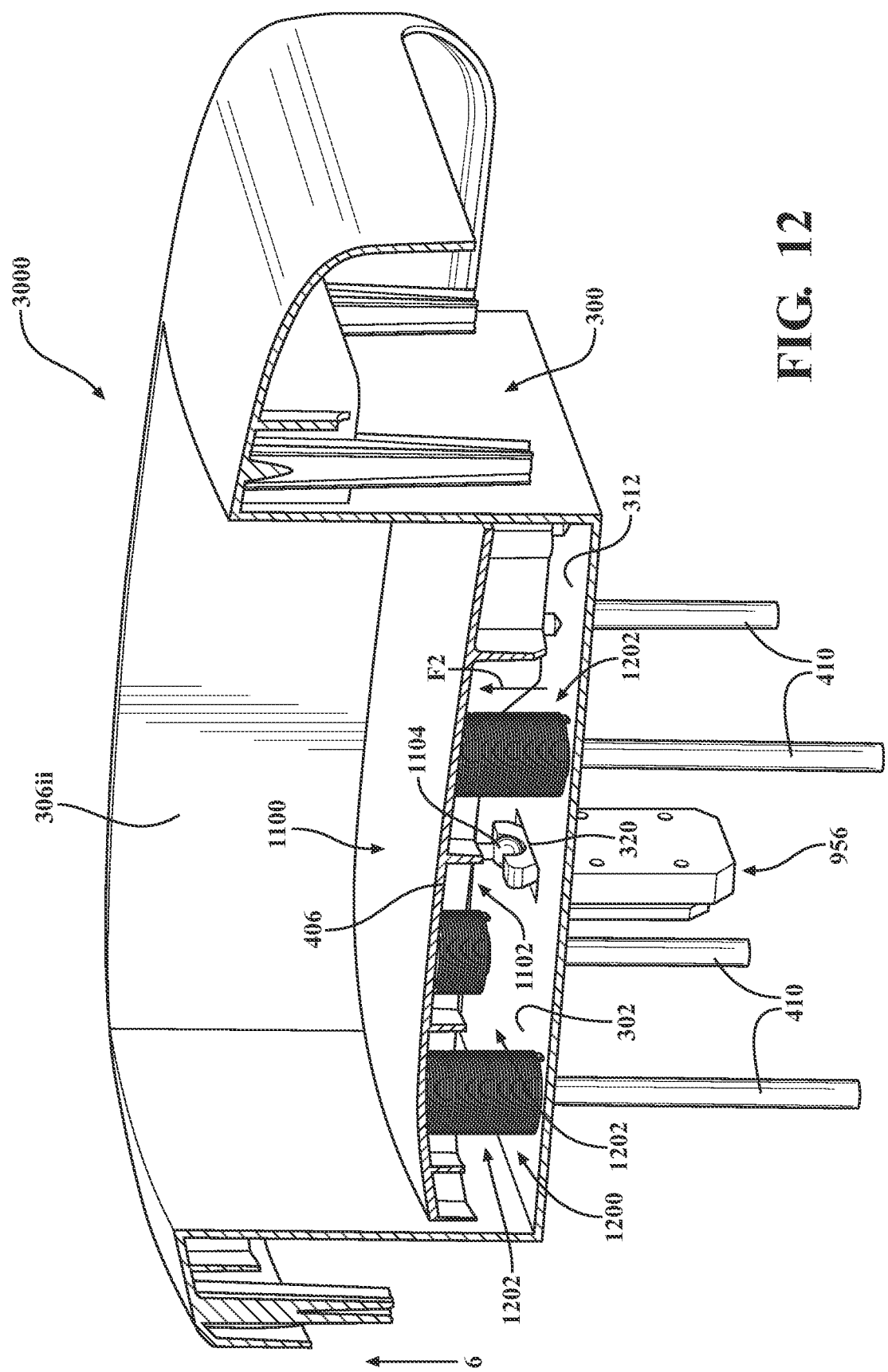
FIG. 12 is a side, cross-sectional, perspective view of the vehicle console seen in FIG. 10 shown in the second configuration.

With reference now to FIGS. 10-12, an alternate embodiment of the vehicle console is illustrated, which is identified by the reference character 3000. The vehicle console 3000 is substantially similar in both structure and function to the vehicle console 1000 discussed above (FIGS. 1-7) and, accordingly, in the interest of brevity, will only be discussed with respect to any differences therefrom. As such, identical reference characters will be utilized to refer to elements, structures, features, etc., common to the vehicle consoles 1000, 3000. As described in detail below, in addition to the main body portion 100 (FIG. 1), the cupholder(s) 200, the housing 300, and the control panel 600, the vehicle console 3000 includes: a panel 1100; an actuation assembly 1200; and the retention mechanism 956, which extends into the inner chamber 302 through a window 320 in the bottom wall 312 of the housing 300.

The panel 1100 includes a series (plurality) of the aforementioned guideposts 410 and a locking member 1102 (e.g., a detent 1104), each of which is located on (supported by) the inner surface (underside) 406 of the panel 1100. The guideposts 410 are rigid in construction and each define a fixed length LG. The guideposts 410 are received by (and extend into/through) corresponding openings 322 (FIG. 11) in the bottom wall 312 of the housing 300 and are configured to support vertical linear movement of the panel 1100 along the axis Y so as to inhibit (if not prevent) lateral movement (e.g., rattling, shaking) of the panel 1100 (e.g., along the axes X, Z), thereby stabilizing the panel 1100 and facilitating uniform (smooth) movement thereof during reconfiguration of the vehicle console 3000 between the first configuration (FIG. 10) and the second configuration (FIG. 12).

The actuation assembly 1200 includes a series (plurality) of biasing members 1202, which correspond in number to the guideposts 410, and are positioned about the guideposts 410 such that the biasing members 1202 are located between the panel 1100 and the bottom wall 312 of the housing 300. In the particular embodiment illustrated, the biasing members 1202 are each configured as a spring 1204. It is envisioned, however, that the configuration of the biasing members 1202 may be varied in alternate embodiments without departing from the scope of the present disclosure.

Although shown as including four guideposts 410 and four biasing members 1202 in the particular embodiment illustrated, it is envisioned that the particular number of guideposts 410 and biasing members 1202 may be varied in alternate embodiments without departing from the scope of the present disclosure. As such, embodiments including both greater and fewer numbers of guideposts 410 and biasing members 1202 are also envisioned herein.

With continued reference to FIGS. 10-12, use and operation of the vehicle console 3000 will be discussed. When necessary or desired, the vehicle console 3000 can be reconfigured from the first configuration (FIG. 10) into the second configuration (FIG. 12) via the (manual) application of force to the panel 1100 along the axis Y (e.g., towards the retention mechanism 956 in the direction identified by arrow 2). The application of force to the panel 1100 causes movement of the guideposts 410 into (within) the openings 322 in the bottom wall 312 of the housing 300 and (vertical) compression of the biasing members 1202. During compression, kinetic energy is stored in the biasing members 1202 in the form of a biasing force F2, which is oriented in the direction identified by arrow 6 (e.g., vertically upwards, towards the panel 1100). Upon reaching the second configuration, the locking member 1102 releasably engages the retention mechanism 956, as seen in FIG. 12, which selectively maintains the vertical position of the panel 1100 and, thus, the second configuration of the vehicle console 3000.

When necessary or desired (e.g., following removal of the article(s) A (FIG. 2) from the external storage compartment 306ii), the vehicle console 3000 can be returned to the first configuration. More specifically, force is again (manually) applied to the panel 1100 along the axis Y (e.g., in the direction identified by arrow 2), which causes disengagement of the locking member 1102 from the retention mechanism 956. Thereafter, the biasing force F2 in each biasing member 1202 acts upon the bottom wall 312 of the housing 300 and the panel 1100 to cause (vertical) expansion of the biasing members 1202 and, thus, movement of the guideposts 410 out of (within) the openings 322 in the bottom wall 312 of the housing 300, thereby returning the vehicle console 3000 to the first configuration.

Figure 13:
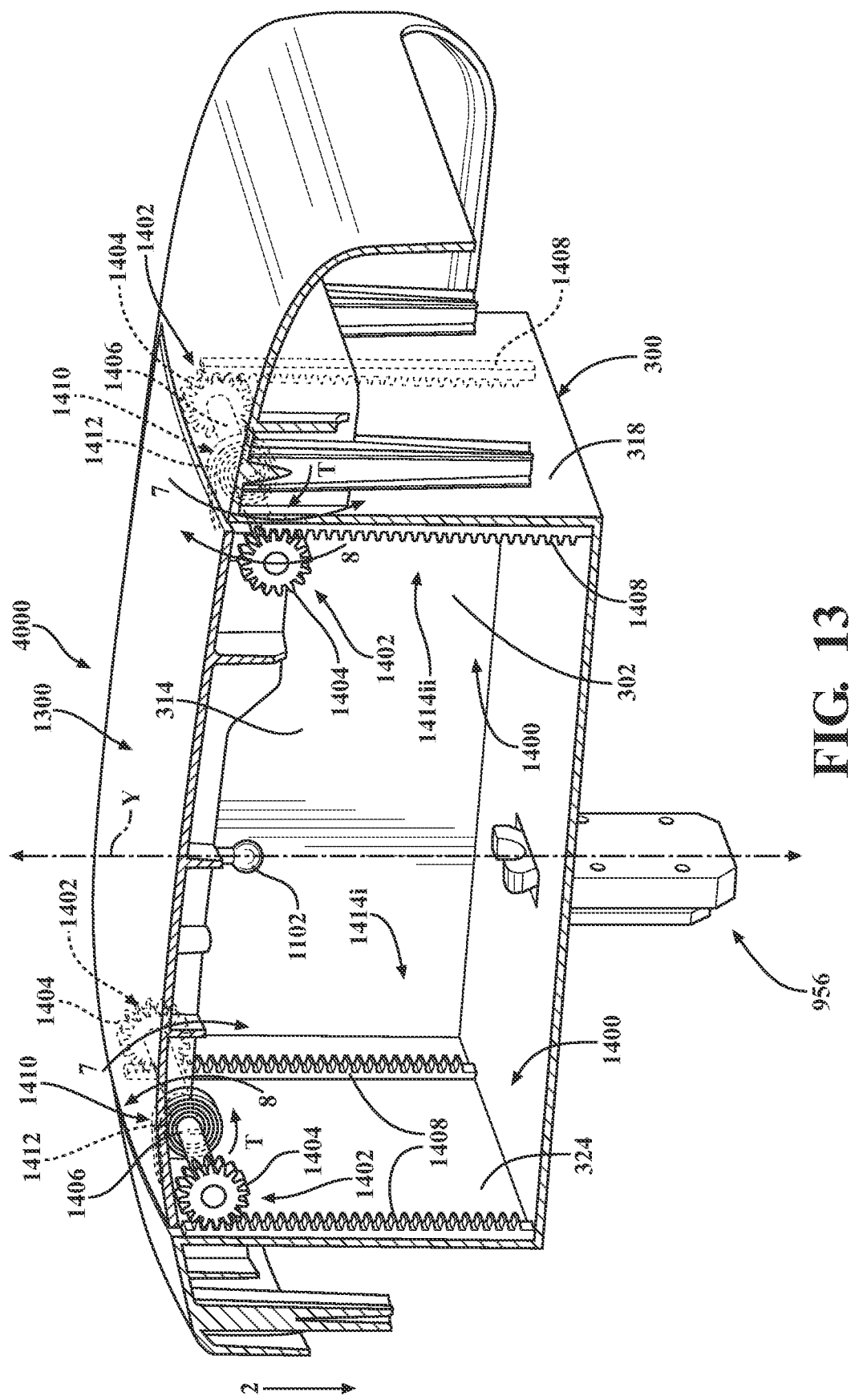
FIG. 13 is a side, cross-sectional, perspective view of an alternate embodiment of the vehicle console shown in the first configuration.

With reference now to FIG. 13, an alternate embodiment of the vehicle console is illustrated, which is identified by the reference character 4000. The vehicle console 4000 is substantially similar in both structure and function to the vehicle console 3000 (FIGS. 10-12) discussed above and, accordingly, in the interest of brevity, will only be discussed with respect to any differences therefrom. As such, identical reference characters will be utilized to refer to elements, structures, features, etc., common to the vehicle consoles 3000, 4000. As described in detail below, in addition to the main body portion 100 (FIG. 1), the cupholder(s) 200, the housing 300, the control panel 600, and the retention mechanism 956, the vehicle console 4000 includes a panel 1300 and an actuation assembly 1400, which is supported by the panel 1300 and the housing 300.

The actuation assembly 1400 includes: a series (plurality) of pinions 1402 (e.g., gears 1404), which are supported by drive axles (shafts) 1406; a series (plurality) of racks 1408 that are in engagement (contact) with the pinions 1402; and a series (plurality) of biasing members 1410 (e.g., torsion springs 1412) that are supported by the drive axles 1406 and are fixedly connected thereto.

Although shown as including four pinions 1402, four racks 1408, and two biasing members 1410 in the particular embodiment illustrated (e.g., such that the vehicle console 4000 includes identical (or generally identical) drive mechanisms 1414i, 1414ii that are oriented (supported) in opposing relation at (front and rear) ends of the housing 300), it is envisioned that the particular numbers of pinions 1402, racks 1408, and biasing members 1410 may be varied in alternate embodiments without departing from the scope of the present disclosure. As such, embodiments including both greater and fewer numbers of pinions 1402, racks 1408, and biasing members 1410 are also envisioned herein. For example, an embodiment of the vehicle console 4000 including a single drive mechanism 1414 (e.g., the drive mechanism 1414i or the drive mechanism 1414ii) is also envisioned herein and would not be beyond the scope of the present disclosure.

The racks 1408 extend vertically within the inner chamber 302 of the housing 300 in parallel (or generally parallel) relation to the axis Y, along which the panel 1300 moves during reconfiguration of the vehicle console 4000 between the first configuration (FIG. 13) and the second configuration (FIG. 2). More specifically, in the particular embodiment illustrated, the racks 1408 are associated with a front wall 324 of the housing 300 and the rear wall 318. It should be appreciated, however, that the particular location of the racks 1408 may be varied in alternate embodiments without departing from the scope of the present disclosure. For example, additionally, or alternatively, it is envisioned that the racks 1408 may be associated with the sidewalls 314 of the housing 300.

The racks 1408 and the housing 300 are configured as discrete components of the vehicle console 4000 that may be connected (secured) together in any suitable manner, such as, for example, through the use of one or more mechanically fasteners (e.g., pins, rivets, screws, etc.), either fixedly or removably, through the use of an adhesive, via heat staking, etc. Alternatively, it is envisioned that the racks 1408 and the housing 300 may be integrally (e.g., monolithically, unitarily) formed.

When necessary or desired, the vehicle console 4000 can be reconfigured from the first configuration (FIG. 13) into the second configuration (FIG. 2) via the (manual) application of force to the panel 1300 along the axis Y (e.g., towards the retention mechanism 956 in the direction identified by arrow 2). The application of force to the panel 1300 causes the pinions 1402 to rotate and traverse the racks 1408, which results in rotation of the drive axles 1406 in first directions, which are identified by the arrows 7. Due to the fixed connection between the drive axles 1406 and the biasing members 1410, rotation of the drive axles 1406 causes torsional deformation of the biasing members 1410, which results in the storage of kinetic energy within in the biasing members 1410 in the form of a torsional force T, which is oriented in the direction identified by arrows 8, which is opposite to the direction of rotation of the drive axles 1406. Upon reaching the second configuration, the locking member 1102 releasably engages the retention mechanism 956, which selectively maintains the vertical position of the panel 1300 and, thus, the second configuration of the vehicle console 4000.

When necessary or desired (e.g., following removal of the article(s) A (FIG. 2) from the external storage compartment 306ii), the vehicle console 4000 can be returned to the first configuration. More specifically, force is again (manually) applied to the panel 1300 along the axis Y (e.g., in the direction identified by 2), which causes disengagement of the locking member 1102 from the retention mechanism 956. Thereafter, the torsional forces F in the biasing members 1410 act upon the drive axles 1406, which causes rotation of the drive axles 1406 and, thus, the pinions 1402, in the direction identified by arrows 8, thereby returning the vehicle console 4000 to the first configuration.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "generally," "approximately," "substantially," and the like should be understood to include the numerical range, concept, or base term with which they are associated as well as variations in the numerical range, concept, or base term on the order of 25% (e.g., to allow for manufacturing tolerances and/or deviations in design). For example, the term "generally orthogonal" should be understood as referring to an arrangement in which the pertinent components (structures, elements) subtend an angle therebetween that is equal to 90° as well as an arrangement in which the pertinent components (structures, elements) subtend an angle therebetween that is greater than or less than 90° (e.g., ±25%).

Although terms such as "first," "second," "third," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A vehicle console comprising:
   a main body portion including an internal storage compartment;
   a housing defining an inner chamber, the housing being movably connected to the main body portion such that the housing is repositionable between open and closed positions to expose and conceal the internal storage compartment;
   a panel movable into and out of the inner chamber such that the vehicle console is reconfigurable between a first configuration, in which the panel is generally flush with an outer surface of the housing, and a second configuration, in which the panel is recessed into the inner chamber so as to define an external storage compartment configured to receive a personal article; and
   an actuation assembly including a scissor lift connected to the panel to facilitate reconfiguration of the vehicle console between the first configuration and the second configuration, wherein the scissor lift includes:
   a first upper leg;
   a second upper leg, wherein the first upper leg and the second upper leg extend in parallel relation;
   a third upper leg located between the first upper leg and the second upper leg and extending in crosswise relation thereto;
   a first lower leg;
   a second lower leg, wherein the first lower leg and the second lower leg extend in parallel relation; and
   a third lower leg located between the first lower leg and the second lower leg and extending in crosswise relation thereto.

2. The vehicle console of claim 1, further comprising a cupholder spaced axially from the housing along a longitudinal axis extending in generally parallel relation to a length of the vehicle console, the cupholder configured to removably receive one or more containers.

3. The vehicle console of claim 1, wherein the actuation assembly further includes a drive mechanism configured to expand and contract the scissor lift and thereby facilitate reconfiguration of the vehicle console between the first configuration and the second configuration.

4. The vehicle console of claim 3, wherein the scissor lift includes an upper end connected to the panel and a lower end connected to the drive mechanism.

5. The vehicle console of claim 4, wherein the upper end of the scissor lift is pivotably and linearly movable in relation to the panel, and the lower end of the scissor lift is pivotably and linearly movable in relation to the housing.

6. The vehicle console of claim 5, wherein the lower end of the scissor lift is pivotably connected to the drive mechanism.

7. The vehicle console of claim 6, wherein the drive mechanism includes:
   a motor;
   a drive shaft rotatably connected to the motor;
   a pinion supported by the drive shaft such that rotation of the drive shaft causes corresponding rotation of the pinion; and
   a rack in engagement with the pinion such that rotation of the pinion causes linear movement of the rack.

8. The vehicle console of claim 7, wherein the lower end of the scissor lift is pivotably connected to the rack such that linear movement of the rack causes corresponding linear movement of the lower end of the scissor lift to thereby expand and contract the scissor lift.

9. A vehicle console comprising:
   a housing defining an inner chamber;
   a panel movable in relation to the housing between an upper vertical position and a lower vertical position, the vehicle console defining a storage compartment configured to receive a personal article when the panel is in the lower vertical position; and
   an actuation assembly configured to facilitate movement of the panel between the upper vertical position and the lower vertical position, the actuation assembly including:
   an upper scissor assembly connected to the panel;
   a lower scissor assembly connected to the upper scissor assembly, wherein the upper scissor assembly and the lower scissor assembly each include three discrete legs; and
   a drive mechanism connected to the lower scissor assembly such that the lower scissor assembly extends between the upper scissor assembly and the drive mechanism.

10. The vehicle console of claim 9, wherein the actuation assembly further includes a stop configured for engagement with the lower scissor assembly to restrict movement of the actuation assembly.

11. The vehicle console of claim 9, wherein the upper scissor assembly is pivotably and linearly movable in relation to the panel.

12. The vehicle console of claim 11, wherein the lower scissor assembly is pivotably connected to the upper scissor assembly.

13. The vehicle console of claim 12, wherein the lower scissor assembly is pivotably and linearly movable in relation to the housing.

14. The vehicle console of claim 13, wherein the drive mechanism includes a rack pivotably connected to the lower scissor assembly such that linear movement of the rack causes corresponding linear movement of the lower scissor assembly.

15. The vehicle console of claim 14, wherein the rack is movable along a first axis and the actuation assembly is movable along a second axis extending in generally orthogonal relation to the first axis.

16. A vehicle console comprising:
a main body portion including an internal storage compartment;
a housing defining an inner chamber, the housing being movably connected to the main body portion such that the housing is repositionable between open and closed positions to expose and conceal the internal storage compartment;
a drive mechanism located within the inner chamber, the drive mechanism including:
   a pinion; and
   a rack positioned adjacent to an inner wall of the housing and in engagement with the pinion such that rotation of the pinion causes linear movement of the rack; and
a panel operatively connected to the drive mechanism such that the panel is movable into and out of the inner chamber along an axis of movement to thereby facilitate reconfiguration of the vehicle console between a normal configuration, in which the panel is generally flush with an outer surface of the housing, and a storage configuration, in which the panel is recessed into the inner chamber so as to define an external storage compartment configured to receive a personal article.

17. The vehicle console of claim 16, wherein the rack extends in generally orthogonal relation to the axis of movement.

18. The vehicle console of claim 16, wherein the rack extends in generally parallel relation to the axis of movement.

* * * * *